US011974117B2

(12) United States Patent
Tsuji et al.

(10) Patent No.: US 11,974,117 B2
(45) Date of Patent: Apr. 30, 2024

(54) INFORMATION PROCESSING DEVICE AND METHOD, REPRODUCTION DEVICE AND METHOD, AND PROGRAM

(71) Applicant: Sony Group Corporation, Tokyo (JP)

(72) Inventors: Minoru Tsuji, Chiba (JP); Toru Chinen, Kanagawa (JP); Yuki Yamamoto, Chiba (JP); Akihito Nakai, Shizuoka (JP)

(73) Assignee: Sony Group Corporation, Tokyo (JP)

( * ) Notice: Subject to any disclaimer, the term of this patent is extended or adjusted under 35 U.S.C. 154(b) by 278 days.

(21) Appl. No.: 17/601,410

(22) PCT Filed: Mar. 27, 2020

(86) PCT No.: PCT/JP2020/014120
§ 371 (c)(1),
(2) Date: Oct. 4, 2021

(87) PCT Pub. No.: WO2020/209103
PCT Pub. Date: Oct. 15, 2020

(65) Prior Publication Data

US 2022/0210597 A1 Jun. 30, 2022

(30) Foreign Application Priority Data

Apr. 11, 2019 (JP) ................................ 2019-075369

(51) Int. Cl.
*H04R 5/02* (2006.01)
*H04S 3/00* (2006.01)
*H04S 7/00* (2006.01)

(52) U.S. Cl.
CPC .............. *H04S 7/303* (2013.01); *H04S 3/008* (2013.01); *H04S 2400/01* (2013.01); *H04S 2400/11* (2013.01); *H04S 2400/13* (2013.01)

(58) Field of Classification Search
CPC ............. H04S 2400/13; H04S 2400/11; H04S 2400/01; H04S 3/008; H04S 7/303
(Continued)

(56) References Cited

U.S. PATENT DOCUMENTS

2013/0343550 A1* 12/2013 Araki ........................ H04S 3/00 381/17
2015/0237446 A1 8/2015 Katayama et al.
(Continued)

FOREIGN PATENT DOCUMENTS

EP 3547718 A1 10/2019
JP 2015-126359 A 7/2015
(Continued)

OTHER PUBLICATIONS

[No Author Listed], International Standard ISO/IEC 23008-3. Information technology—High efficiency coding and media delivery in heterogeneous environments—Part 3: 3D audio. Aug. 2022. 882 pages.

(Continued)

*Primary Examiner* — Ammar T Hamid
(74) *Attorney, Agent, or Firm* — Wolf, Greenfield & Sacks, P.C.

(57) ABSTRACT

The present technology relates to an information processing device and method, a reproduction device and method, and a program that are capable of performing gain correction more easily.
An information processing device includes a gain correction value decision unit that decides a correction value of a gain value for performing gain correction on an audio signal of an audio object in accordance with a direction of the audio object viewed from a listener. The present technology can be applied to a gain decision device and a reproduction device.

18 Claims, 19 Drawing Sheets

(58) Field of Classification Search
USPC .......................................................... 381/303
See application file for complete search history.

(56) References Cited

U.S. PATENT DOCUMENTS

| | | | | |
|---|---|---|---|---|
| 2016/0337777 | A1* | 11/2016 | Tsuji ....................... | H04S 7/302 |
| 2019/0130922 | A1 | 5/2019 | Tsukagoshi et al. | |

FOREIGN PATENT DOCUMENTS

| | | | |
|---|---|---|---|
| JP | 2018-116299 | A | 7/2018 |
| WO | WO 2015/107926 | A1 | 7/2015 |
| WO | WO 2018/096954 | A1 | 5/2018 |

OTHER PUBLICATIONS

International Search Report and English translation thereof dated Jun. 16, 2020 in connection with International Application No. PCT/JP2020/014120.

[No Author Listed], International Standard ISO/IEC 23008-3. Information technology—High efficiency coding and media delivery in heterogeneous environments—Part 3: 3D audio. Feb. 1, 2016. 439 pages.

* cited by examiner

FIG. 5

| Azimuth [deg.] | Elevation [deg.] | Radius [m] | GAIN CORRECTION VALUE [dB] |
|---|---|---|---|
| 0 | 0 | 1.0 | 0.0 |
| 30 | 0 | 1.0 | −0.02 |
| −30 | 0 | 1.0 | −0.07 |
| 60 | 0 | 1.0 | −0.06 |
| −60 | 0 | 1.0 | −0.32 |
| 90 | 0 | 1.0 | −0.52 |
| −90 | 0 | 1.0 | −0.44 |
| 120 | 0 | 1.0 | −0.43 |
| −120 | 0 | 1.0 | −0.41 |
| 150 | 0 | 1.0 | 0.33 |
| −150 | 0 | 1.0 | 0.51 |
| 180 | 0 | 1.0 | 0.63 |

FIG. 6

| GAIN CORRECTION VALUE [dB] | | Azimuth [deg.] | | | | | | | | | | | |
|---|---|---|---|---|---|---|---|---|---|---|---|---|---|
| | | 0 | 30 | −30 | 60 | −60 | 90 | −90 | 120 | −120 | 150 | −150 | 180 |
| Elevation [deg.] | 30 | 0.33 | - | - | −0.07 | −0.03 | | | 0.43 | 0.81 | - | - | 0.66 |
| | 0 | 0.00 | −0.02 | −0.07 | −0.06 | −0.32 | −0.52 | −0.44 | −0.43 | −0.41 | 0.33 | 0.51 | 0.63 |
| | −30 | −0.44 | | | −0.28 | −0.32 | | | 0.32 | 0.28 | - | - | 0.40 |

FIG. 16

| GAIN CORRECTION VALUE [dB] | | Azimuth [deg.] | | | | | | | | | | | |
|---|---|---|---|---|---|---|---|---|---|---|---|---|---|
| | | 0 | 30 | -30 | 60 | -60 | 90 | -90 | 120 | -120 | 150 | -150 | 180 |
| Elevation [deg.] | 30 | -0.33 | - | - | 0.07 | 0.03 | | | -0.43 | -0.81 | - | - | -0.66 |
| | 0 | 0.00 | 0.02 | 0.07 | 0.06 | 0.32 | 0.52 | 0.44 | 0.43 | 0.41 | -0.33 | -0.51 | -0.63 |
| | -30 | 0.44 | | | 0.28 | 0.32 | | | -0.32 | -0.28 | - | - | -0.40 |

FIG. 17

| Syntax | No. of bits | Mnemonic |
|---|---|---|
| GainAuditoryProperty() | | |
| { | | |
| **numGainAuditoryPropertyTables** | 4 | uimsbf |
| for (i = 0; i < numGainAuditoryPropertyTables; i++) { | | |
| **numElements**[i] | 4 | uimsbf |
| for (n = 0; n < numElements; n++) { | | |
| **azimuth**[i][n] | 8 | tcimsbf |
| **elevation**[i][n] | 6 | tcimsbf |
| **radius**[i][n] | 4 | uimsbf |
| **gainCompensValue**[i][n] | 7 | tcmsbf |
| } | | |
| } | | |
| **hasGainCompensObjects**; | 1 | bslbf |
| if (hasGainCompensObjects) { | | |
| for (o = 0; o < num_objects; o++) { | | |
| **isGainCompensObject**[o]; | 1 | bslbf |
| if (isGainCompensObject[o] && numGainAuditoryPropertyTables) { | | |
| **applyTableIndex**[o]; | 4 | uimsbf |
| } | | |
| } | | |
| } | | |
| } | | |

INFORMATION PROCESSING DEVICE AND METHOD, REPRODUCTION DEVICE AND METHOD, AND PROGRAM

CROSS-REFERENCE TO RELATED APPLICATIONS

This application claims the benefit under 35 U.S.C. § 371 as a U.S. National Stage Entry of International Application No. PCT/JP2020/014120, filed in the Japanese Patent Office as a Receiving Office on Mar. 27, 2020, which claims priority to Japanese Patent Application Number JP2019-075369, filed in the Japanese Patent Office on Apr. 11, 2019, each of which is hereby incorporated by reference in its entirety.

TECHNICAL FIELD

The present technology relates to an information processing device and method, a reproduction device and method, and a program, and in particular, relates to an information processing device and method, a reproduction device and method, and a program that are capable of performing gain correction more easily.

BACKGROUND ART

Conventionally, the Moving Picture Experts Group (MPEG)-H 3D Audio standard is known (see, for example, Non-Patent Document 1 and Non-Patent Document 2).

With 3D Audio, which is handled by the MPEG-H 3D Audio standard and the like, it is possible to reproduce three-dimensional sound direction, distance, spread, and the like, and it is possible to perform audio reproduction with more realistic feeling compared with the conventional stereo reproduction.

CITATION LIST

Non-patent Document

Non-Patent Document 1: ISO/IEC 23008-3, MPEG-H 3D Audio
Non-Patent Document 2: ISO/IEC 23008-3:2015/AMENDMENT3, MPEG-H 3D Audio Phase 2

SUMMARY OF THE INVENTION

Problems to be Solved by the Invention

However, with 3D Audio, the time cost of production of contents (3D audio contents) increases.

For example, in 3D Audio, the number of dimensions of position information of the object, i.e., position information of the sound source, is higher than that in stereo (3D Audio is three-dimensional and stereo is two-dimensional). Therefore, with 3D Audio, time cost increases, in particular, in the work of deciding parameters constituting metadata for each object such as a horizontal angle and a vertical angle indicating the position of the object, a distance, and a gain for the object.

Furthermore, the number of 3D audio contents is overwhelmingly smaller than stereo contents in terms of both contents and creators. Therefore, there are currently a little amount of high-quality 3D audio contents.

On the other hand, as the auditory property, perception of the loudness of a sound varies depending on the arrival direction of the sound. That is, the loudness of even the sound of the same object in the auditory sensation varies between a case where the object is present in front of the listener and a case where the object is present in the lateral of the listener, as well as between a case where the object is present above the listener and a case where the object is present below the listener. Hence, gain correction in the light of such auditory property is required.

From the above, it is desired to perform gain correction more easily, and therefore, to become able to produce 3D audio contents of sufficient quality in a short time.

The present technology has been made in view of such a circumstance, and enables gain correction to be performed more easily.

Solutions to Problems

An information processing device of the first aspect of the present technology includes a gain correction value decision unit that decides a correction value of a gain value for performing gain correction on an audio signal of an audio object in accordance with a direction of the audio object viewed from a listener.

An information processing method or program of the first aspect of the present technology includes a step of deciding a correction value of a gain value for performing gain correction on an audio signal of an audio object in accordance with a direction of the audio object viewed from a listener.

In the first aspect of the present technology, a correction value of a gain value for performing gain correction on an audio signal of an audio object is decided in accordance with a direction of the audio object viewed from a listener.

A reproduction device of a second aspect of the present technology includes a gain correction unit that decides, on the basis of position information indicating a position of an audio object, a correction value of a gain value for performing gain correction on an audio signal of the audio object, the correction value in accordance with a direction of the audio object viewed from a listener, and performs the gain correction on the audio signal on the basis of the gain value corrected by the correction value, and a renderer processing unit that performs rendering processing on the basis of the audio signal obtained by the gain correction and generates reproduction signals of a plurality of channels for reproducing sound of the audio object.

A reproduction method or program of the second aspect of the present technology includes steps of deciding, on the basis of position information indicating a position of an audio object, a correction value of a gain value for performing gain correction on an audio signal of the audio object, the correction value in accordance with a direction of the audio object viewed from a listener, and performing the gain correction on the audio signal on the basis of the gain value corrected by the correction value, performing rendering processing on the basis of the audio signal obtained by the gain correction, and generating reproduction signals of a plurality of channels for reproducing sound of the audio object.

In the second aspect of the present technology, on the basis of position information indicating a position of an audio object, a correction value of a gain value for performing gain correction on an audio signal of the audio object, the correction value in accordance with a direction of the audio object viewed from a listener is decided, the gain correction on the audio signal is performed on the basis of the gain value corrected by the correction value, rendering processing is performed on the basis of the audio signal obtained by the gain correction, and reproduction signals of a plurality of channels for reproducing sound of the audio object are generated.

BRIEF DESCRIPTION OF DRAWINGS

FIG. 5 is a view showing an example of an auditory property table.

FIG. 6 is a view showing an example of an auditory property table.

FIG. 16 is a view showing an example of an auditory property table.

FIG. 17 is a view showing a syntax example of gain auditory property information.

MODE FOR CARRYING OUT THE INVENTION

Embodiments to which the present technology is applied will be explained below with reference to the drawings.

First Embodiment

<Regarding Present Technology>

The present technology is to make it possible to perform gain correction more easily by deciding a gain correction value in accordance with a direction of an object viewed from a listener, and therefore, to make it possible to create 3D audio contents of sufficiently high quality more easily, i.e., in a short time.

In particular, the present technology has the following features (F1) to (F5).

Feature (F1): A gain correction value of an object is decided in accordance with a three-dimensional auditory property with respect to a localization position of a sound image Feature (F2): In a case where an auditory property is given by a table and the like, a gain correction value with respect to a localization position without data is calculated by interpolation processing and the like based on a gain correction value of an adjacent position Feature (F3): In automatic mixing, gain information is decided from separately decided position information Feature (F4): A user interface that sets and adjusts a gain correction value with respect to an object position is provided Feature (F5): A gain correction value in accordance with a three-dimensional auditory property is applied in association with a change of an object position with respect to a listening position First, decision of a gain parameter based on a human three-dimensional auditory property will be explained.

Figure 1:
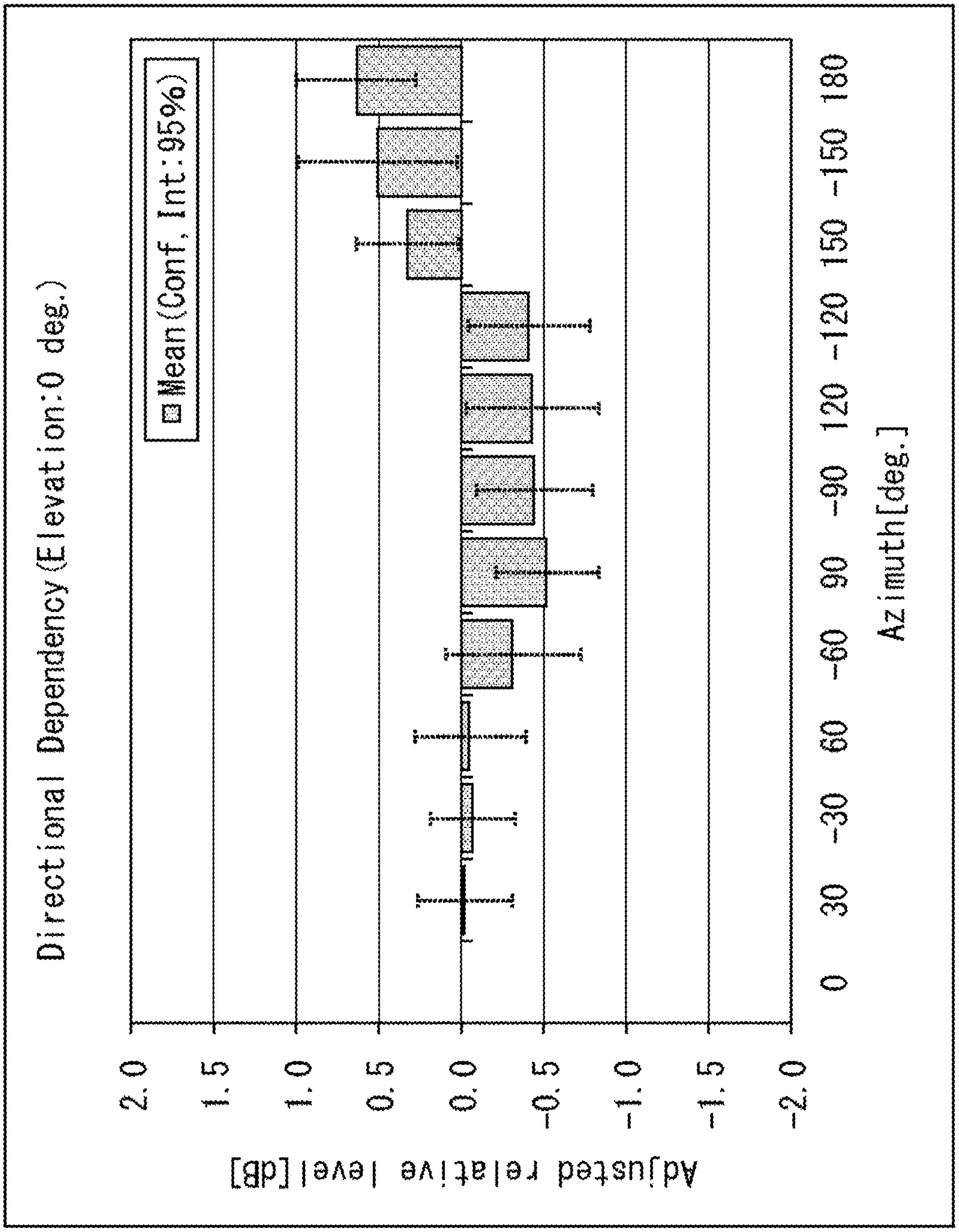
FIG. 1 is a view explaining an auditory property with respect to an arrival direction of a sound.

FIG. 1 shows a gain correction amount when gain correction of pink noise is performed so that the listener feels that the loudness of the sound on the auditory sensation is the same when the same pink noise is reproduced from different directions with reference to the loudness of the sound on the auditory sensation when certain pink noise is reproduced just in front of the listener. In other words, FIG. 1 shows an auditory property with respect to the horizontal direction that a human has.

Note that in FIG. 1, the vertical axis represents the gain correction amount, and the horizontal axis represents an azimuth value (horizontal angle), which is an angle in the horizontal direction, indicating a sound source position viewed from the listener.

For example, the azimuth value indicating the direction just in front as viewed from the listener is 0 degrees, the azimuth value indicating the direction just beside, that is, lateral as viewed from the listener is ±90 degrees, and the azimuth value indicating the rearward direction, that is, just behind the listener is 180 degrees. In particular, the left direction viewed from the listener is the positive direction of the azimuth value.

Furthermore, in FIG. 1, the position in the vertical direction at the time of reproduction of pink noise is the same height as that of the listener. That is, let the vertical angle indicating the position of the sound source in the vertical direction (elevation angle direction) as viewed from the listener be an elevation value, FIG. 1 is an example of a case where the elevation value is 0 degrees. Note that the upward direction as viewed from the listener is the positive direction of the elevation value.

This example shows a mean value of the gain correction amount with respect to each azimuth value obtained from the result of an experiment conducted on a plurality of listeners, and in particular, the range represented by a dotted line in each azimuth value indicates a 95% confidence interval.

For example, when pink noise is reproduced on the lateral (azimuth value=±90 degrees, elevation value=0 degrees), it is known that by slightly lowering the gain, the listener feels that he hears the sound with the same loudness as when the pink noise is reproduced in the front direction.

Furthermore, for example, when pink noise is reproduced on the behind (azimuth value=180 degrees, elevation value=0 degrees), it is known that by slightly raising the gain, the listener feels that he hears the sound with the same loudness as when the pink noise is reproduced in the front direction.

That is, with respect to a certain object sound source, it is possible to make the listener feel that he hears the sound with the same loudness by slightly lowering the gain of the sound of the object sound source when the localization position of the object sound source is present on the lateral of the listener, and by slightly raising the gain of the sound of the object sound source when the localization position of the object sound source is present on the behind of the listener.

Figure 2:
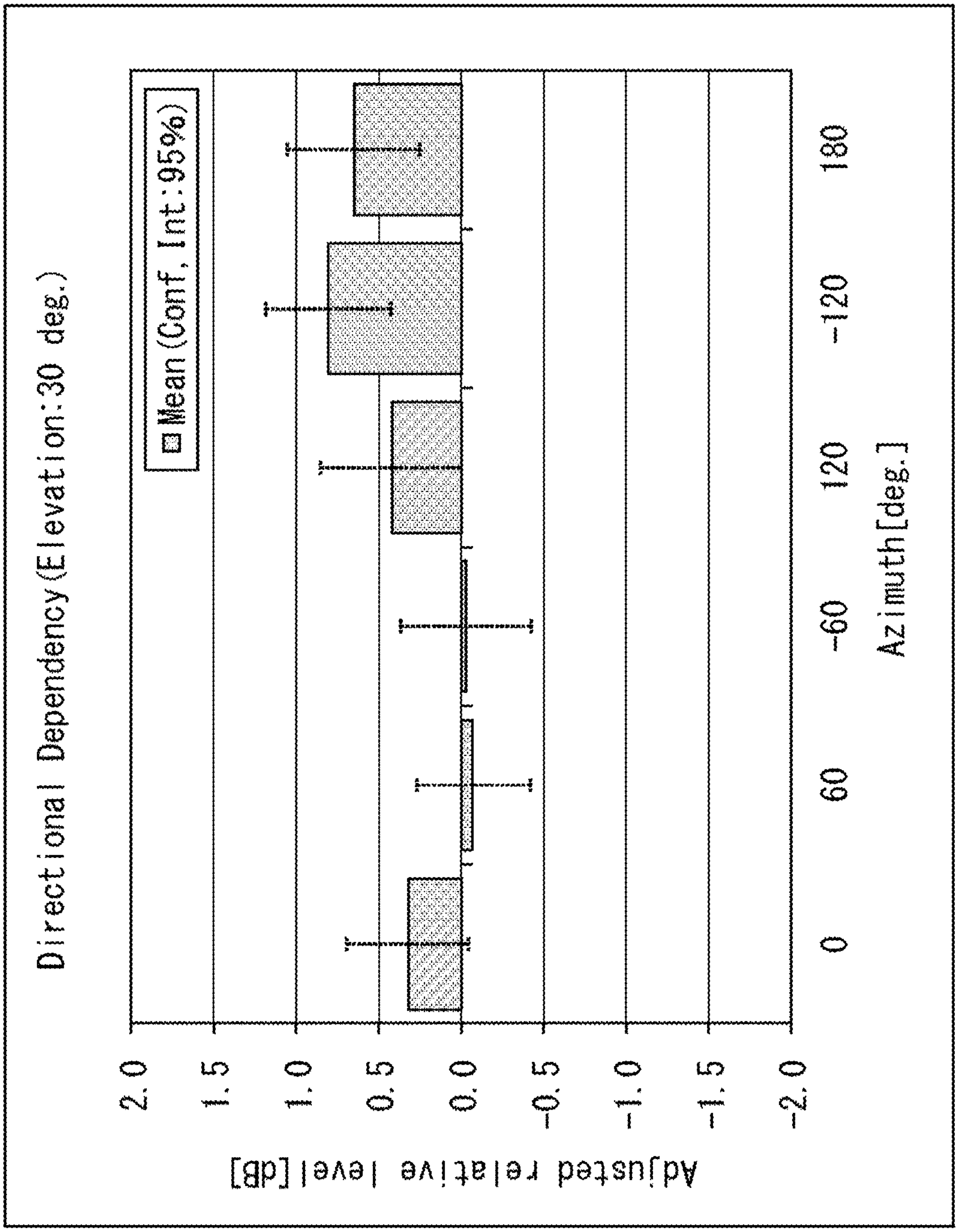
FIG. 2 is a view explaining an auditory property with respect to an arrival direction of a sound.
Figure 3:
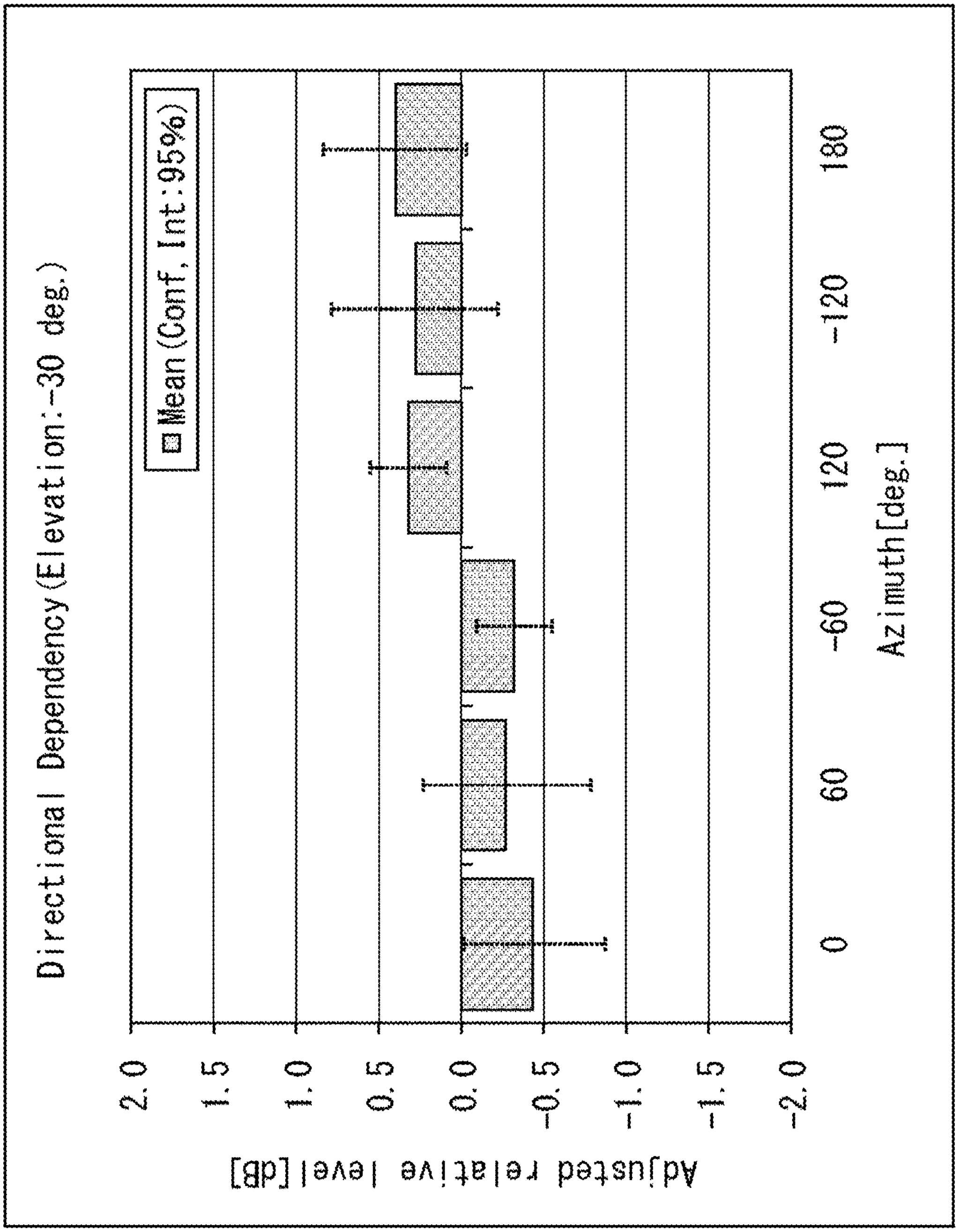
FIG. 3 is a view explaining an auditory property with respect to an arrival direction of a sound.

Furthermore, for example, as shown in FIGS. 2 and 3, it is known that how the listener hears also changes if the elevation value changes even with the same azimuth value.

Note that in FIGS. 2 and 3, the vertical axis represents the gain correction amount, and the horizontal axis represents the azimuth value (horizontal angle) indicating the sound source position viewed from the listener. Furthermore, in FIGS. 2 and 3, the range represented by a dotted line in each azimuth value indicates a 95% confidence interval.

FIG. 2 shows the gain correction amount at each azimuth value in a case where the elevation value is 30 degrees.

FIG. 2 indicates that in a case where the sound source is present at a position higher than the listener, the sound is heard silent when the sound source is present in front of, behind, or diagonally behind the listener, and the sound is heard slightly loud when the sound source is present diagonally in front of the listener.

Similarly, FIG. 3 shows the gain correction amount at each azimuth value in a case where the elevation value is −30 degrees.

FIG. 3 indicates that in a case where the sound source is present at a position lower than the listener, the sound is heard loud when the sound source is present in front of or diagonally in front of the listener, and the sound is heard silent when the sound source is present behind or diagonally behind the listener.

It is known that it is possible to perform an appropriate gain correction more easily if the gain correction amount with respect to the object sound source is decided on the basis of the position information indicating the position of the object sound source and the auditory property of the listener from the auditory property with respect to the sound arrival direction as described above.

<Configuration Example of Information Processing Device>

Figure 4:
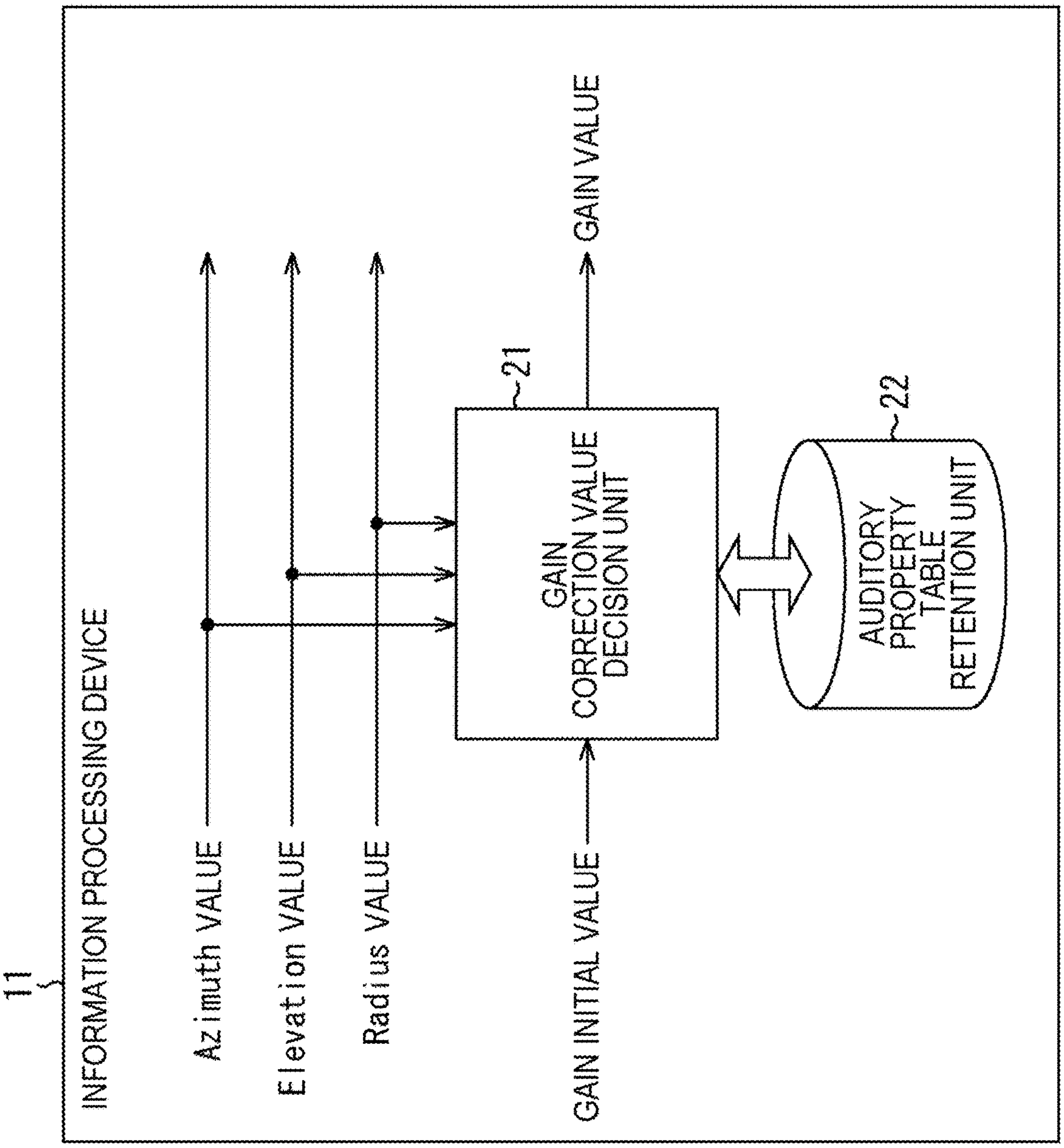
FIG. 4 is a view showing a configuration example of an information processing device.

FIG. 4 is a view showing a configuration example of an embodiment of an information processing device to which the present technology is applied.

An information processing device 11 shown in FIG. 4 functions as a gain decision device that decides a gain value for gain correction on an audio signal for reproducing a sound of an audio object (hereinafter, simply referred to as an object) constituting 3D audio contents.

Such the information processing device 11 is provided in an edit device or the like that performs mixing of an audio signal constituting 3D audio contents, for example.

The information processing device 11 has a gain correction value decision unit 21 and an auditory property table retention unit 22.

Position information and a gain initial value are supplied to the gain correction value decision unit 21 as metadata of an object constituting 3D audio content.

Here, the position information of the object is information indicating the position of the object viewed from a reference position in a three-dimensional space, and here, the position information includes an azimuth value, an elevation value, and a radius value. Note that, in this example, the position of the listener is the reference position.

The azimuth value and the elevation value are angles indicating each position in the horizontal direction and the vertical direction of the object viewed from the listener (user) present at the reference position, and the azimuth value and the elevation value are similar to those in a case of FIGS. 1 to 3.

Furthermore, the radius value is a distance (radius) from the listener present at the reference position in the three-dimensional space to the object.

It can be said that the position information including such the azimuth value, the elevation value, and the radius value indicates the localization position of the sound image of the sound of the object.

Furthermore, the gain initial value included in the metadata supplied to the gain correction value decision unit 21 is a gain value for gain correction on the audio signal of the object, that is, an initial value of the gain information, and this gain initial value is decided by, for example, the creator or the like of the 3D audio content. Note that for simplifying the explanation, the gain initial value is assumed to be 1.0.

The gain correction value decision unit 21 decides the gain correction value indicating the gain correction amount for correcting the gain initial value of the object on the basis of the position information as the supplied metadata and the auditory property table retained in the auditory property table retention unit 22.

Furthermore, the gain correction value decision unit 21 corrects the supplied gain initial value on the basis of the decided gain correction value, and sets the resultant gain value as information indicating the final gain correction amount for performing gain correction on the audio signal of the object.

In other words, the gain correction value decision unit 21 decides the gain correction value in accordance with the direction (sound arrival direction) of the object as viewed from the listener, which is indicated by the position information, thereby deciding the gain value of the audio signal. The thus decided gain value and the supplied position information are output to the subsequent stage as the final metadata of the object.

The auditory property table retention unit 22 retains an auditory property table, and supplies, to the gain correction value decision unit 21, a gain correction value indicated by the auditory property table as necessary.

Here, the auditory property table is a table in which the arrival direction of the sound from the object that is the sound source to the listener, that is, the direction of the sound source viewed from the listener is associated with the gain correction value in accordance with the direction.

That is, more specifically, the auditory property table is a table in which the relative positional relationship between the sound source and the listener is associated with the gain correction value in accordance with the positional relationship.

The gain correction value indicated by the auditory property table is determined in accordance with the human auditory property with respect to the sound arrival direction as shown in FIGS. 1 to 3, for example, and is a gain correction amount such that the loudness of the sound on the auditory sensation becomes constant regardless of the sound arrival direction in particular.

That is, if gain correction is performed on the audio signal of the object using the gain value obtained by correcting the gain initial value by the gain correction value indicated by the auditory property table, the sound of the same object is heard with the same loudness regardless of the position of the object.

Here, FIG. 5 shows an example of the auditory property table.

In the example shown in FIG. 5, the gain correction value is associated with the position of the object determined by the azimuth value, the elevation value, and the radius value, that is, the direction of the object.

In particular, this example assumes that all the elevation values and the radius values are 0 and 1.0, the position of the object in the vertical direction is at the same height as the listener, and the distance from the listener to the object is always constant.

In the example of FIG. 5, for example, in a case where the object that is the sound source is present behind the listener, such as in a case where the azimuth value is 180 degrees, the gain correction value has become larger than that in a case where the object is present in front of the listener, such as in a case where the azimuth value is 0 degrees or 30 degrees.

On the other hand, for example, in a case where the object that is the sound source is present in the lateral of the listener, such as in a case where the azimuth value is 90 degrees, the gain correction value has become smaller than that in a case where the object is present in front of the listener.

Moreover, a specific example of correction of the gain initial value by the gain correction value decision unit 21 in a case where the auditory property table retention unit 22 retains the auditory property table shown in FIG. 5 will be described.

For example, on an assumption that the azimuth value, the elevation value, and the radius value that indicate the position of the object are 90 degrees, 0 degrees, and 1.0 m, the gain correction value corresponding to the position of the object is −0.52 dB from FIG. 5.

Therefore, the gain correction value decision unit 21 performs calculation of the following expression (1) on the basis of the gain correction value "−0.52 dB" read from the auditory property table and the gain initial value "1.0", and gives a gain value "0.94".

[Expression 1]

$$1.0\times10^{-0.52/20}\cong0.94 \quad (1)$$

Similarly, for example, on an assumption that the azimuth value, the elevation value, and the radius value that indicate the position of the object are −150 degrees, 0 degrees, and 1.0 m, the gain correction value corresponding to the position of the object is 0.51 dB from FIG. 5.

Therefore, the gain correction value decision unit 21 performs calculation of the following expression (2) on the basis of the gain correction value "0.51 dB" read from the auditory property table and the gain initial value "1.0", and gives a gain value "1.06".

[Expression 2]

$$1.0\times10^{0.51/20}\cong1.06 \quad (2)$$

Note that in FIG. 5, an example of using the gain correction value decided on the basis of the two-dimensional auditory property in which only the horizontal direction is considered has been described. That is, an example of using the auditory property table (hereinafter, also referred to as a two-dimensional auditory property table) generated on the basis of the two-dimensional auditory property has been described.

However, the gain initial value may be corrected using the gain correction value decided on the basis of the three-dimensional auditory property in which the property of not only the horizontal direction but also the vertical direction is considered.

In such a case, it is possible to use the auditory property table shown in FIG. 6, for example.

In the example shown in FIG. 6, the gain correction value is associated with the position of the object determined by the azimuth value, the elevation value, and the radius value, that is, the direction of the object.

In particular, in this example, the radius value is 1.0 in all the combinations of the azimuth value and the elevation value.

Hereinafter, the auditory property table generated on the basis of the three-dimensional auditory property with respect to the sound arrival direction as shown in FIG. 6 is also referred to as a three-dimensional auditory property table in particular.

Here, a specific example of correction of the gain initial value by the gain correction value decision unit 21 in a case where the auditory property table retention unit 22 retains the auditory property table shown in FIG. 6 will be described.

For example, on an assumption that the azimuth value, the elevation value, and the radius value that indicate the position of the object are 60 degrees, 30 degrees, and 1.0 m, the gain correction value corresponding to the position of the object is −0.07 dB from FIG. 6.

Therefore, the gain correction value decision unit 21 performs calculation of the following expression (3) on the basis of the gain correction value "−0.07 dB" read from the auditory property table and the gain initial value "1.0", and gives a gain value "0.99".

[Expression 3]

$$1.0\times10^{0.07/20}\cong0.99 \quad (3)$$

Note that in the specific example of the gain value calculation described above, the gain correction value based on the auditory property determined with respect to the position (direction) of the object is prepared in advance. That is, the example in which the gain correction value corresponding to the position information of the object is stored in the auditory property table has been described.

However, the position of the object is not necessarily present at the position where the corresponding gain correction value is stored in the auditory property table.

Specifically, for example, it is assumed that the auditory property table shown in FIG. 6 is retained in the auditory property table retention unit 22, and the azimuth value, the elevation value, and the radius value as the position information are −120 degrees, 15 degrees, and 1.0 m.

In this case, gain correction values corresponding to the azimuth value "−120", the elevation value "15", and the radius value "1.0" are not stored in the auditory property table of FIG. 6.

Therefore, in a case where there is a gain correction value corresponding to the position indicated by the position information is not present in the auditory property table, the gain correction value decision unit 21 may calculate the gain correction value at a desired position by interpolation processing or the like using data (gain correction value) at a plurality of positions where the corresponding gain correction value adjacent to the position indicated by the position information exists.

In other words, in a case where the gain correction value corresponding to the direction (position) of the object viewed from the listener is not stored in the auditory property table, the gain correction value may be obtained by interpolation processing or the like based on the gain correction value corresponding to another direction of the object viewed from the listener.

For example, gain correction value interpolation methods include vector base amplitude panning (VBAP).

VBAP is for obtaining gain values of a plurality of speakers in a reproduction environment from the metadata of an object for each object.

Here, it is possible to calculate the gain correction value at a desired position by replacing the plurality of speakers in the reproduction environment with a plurality of gain correction values.

Specifically, a mesh is divided at a plurality of positions where the gain correction value is prepared in the three-dimensional space. That is, for example, on an assumption that the gain correction value for each of three positions in the three-dimensional space is prepared, one triangular region having these three positions as vertices is one mesh.

When the three-dimensional space is thus divided into a plurality of meshes, a mesh including an attention position is specified with a desired position for obtaining the gain correction value as the attention position.

Furthermore, a coefficient to be multiplied by a position vector indicating each of the three vertex positions when the position vector indicating the attention position is represented by multiplication and addition of the position vectors indicating the three vertex positions constituting the specified mesh is obtained.

Then, each of the three coefficients thus obtained is multiplied by the respective gain correction values of the three vertex positions of the mesh including the attention position, and the sum of the gain correction values multiplied by the coefficient is calculated as the gain correction value of the attention position.

Specifically, it is assumed that the position vectors indicating the three vertex positions of the mesh including the attention position are $P_1$ to $P_3$, and the gain correction values of the vertex positions are $G_1$ to $G_3$.

At this time, it is assumed that the position vector indicating the attention position is expressed by $g_1P_1+g_2P_2+g_3P_3$. In this case, the gain correction value for the attention position is $g_1G_1+g_2G_2+g_3G_3$.

Note that the interpolation method of the gain correction value is not limited to the interpolation by VBAP, and any other method may be used.

For example, the mean value of the gain correction values at N (for example, N=5) positions in the vicinity of the attention position among the positions where the gain correction value exists in the auditory property table may be used as the gain correction value of the attention position.

Furthermore, for example, the gain correction value at the position closest to the attention position among the positions where the gain correction value exists in the auditory property table may be used as the gain correction value of the attention position.

Moreover, although the example in which the gain correction value is obtained in a decibel value has been described here, the gain correction value may be obtained in a linear value. In such a case, for example, even when obtaining the gain correction value in a linear value by interpolation using VBAP, it is possible to obtain the gain correction value at a discretionary position by calculation similar to that in the case of the above-described decibel value.

In addition, the present technology can also be applied to a case where position information as metadata of an object, that is, the azimuth value, the elevation value, and the radius value are decided on the basis of the object type, priority, sound pressure, pitch, and the like.

In this case, the gain correction value is decided on the basis of, for example, the position information decided on the basis of the object type, priority, and the like and the three-dimensional auditory property table prepared in advance.

<Explanation of Gain Value Decision Processing>

Figure 7:
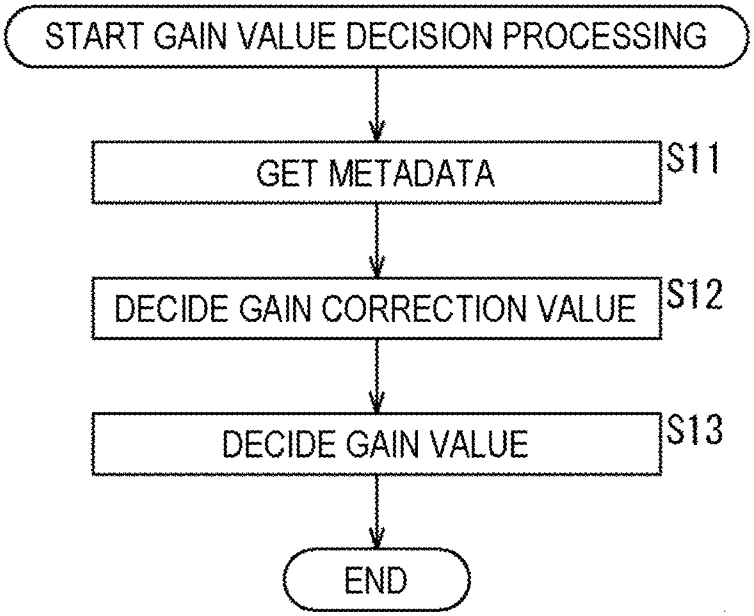
FIG. 7 is a flowchart explaining gain value decision processing.

Subsequently, the operation of the information processing device 11 will be described. That is, the gain value decision processing performed by the information processing device 11 will be described below with reference to the flowchart of FIG. 7.

In step S11, the gain correction value decision unit 21 acquires metadata from the outside.

That is, the gain correction value decision unit 21 acquires, as metadata, the position information including the azimuth value, the elevation value, and the radius value, and the gain initial value.

In step S12, the gain correction value decision unit 21 decides the gain correction value on the basis of the position information acquired in step S11 and the auditory property table retained in the auditory property table retention unit 22.

That is, the gain correction value decision unit 21 reads, from the auditory property table, the gain correction value associated with the azimuth value, the elevation value, and the radius value constituting the acquired position information, and sets the read gain correction value as the decided gain correction value.

In step S13, the gain correction value decision unit 21 decides a gain value on the basis of the gain initial value acquired in step S11 and the gain correction value decided in step S12.

That is, the gain correction value decision unit 21 obtains a gain value by performing calculation similar to expression (1) on the basis of the gain initial value and the gain correction value and correcting the gain initial value with the gain correction value.

When the gain value is thus decided, the gain correction value decision unit 21 outputs the decided gain value to the subsequent stage, and the gain value decision processing ends. The gain value having been output is used for gain correction (gain adjustment) on an audio signal in the subsequent stage.

As described above, the information processing device 11 decides the gain correction value using the auditory property table, and decides the gain value by correcting the gain initial value with the gain correction value.

This makes it possible to perform the gain correction more easily. Therefore, for example, it becomes possible to create 3D audio contents of sufficiently high quality more easily, i.e., in a short time.

Second Embodiment

<Regarding User Interface>

Furthermore, according to the present technology, it is possible to provide a user interface for setting and adjusting the gain correction value described above.

For example, the present technology can be applied to a 3D audio content creation tool that decides the position or the like of an object by user input or automatically.

Figure 8:
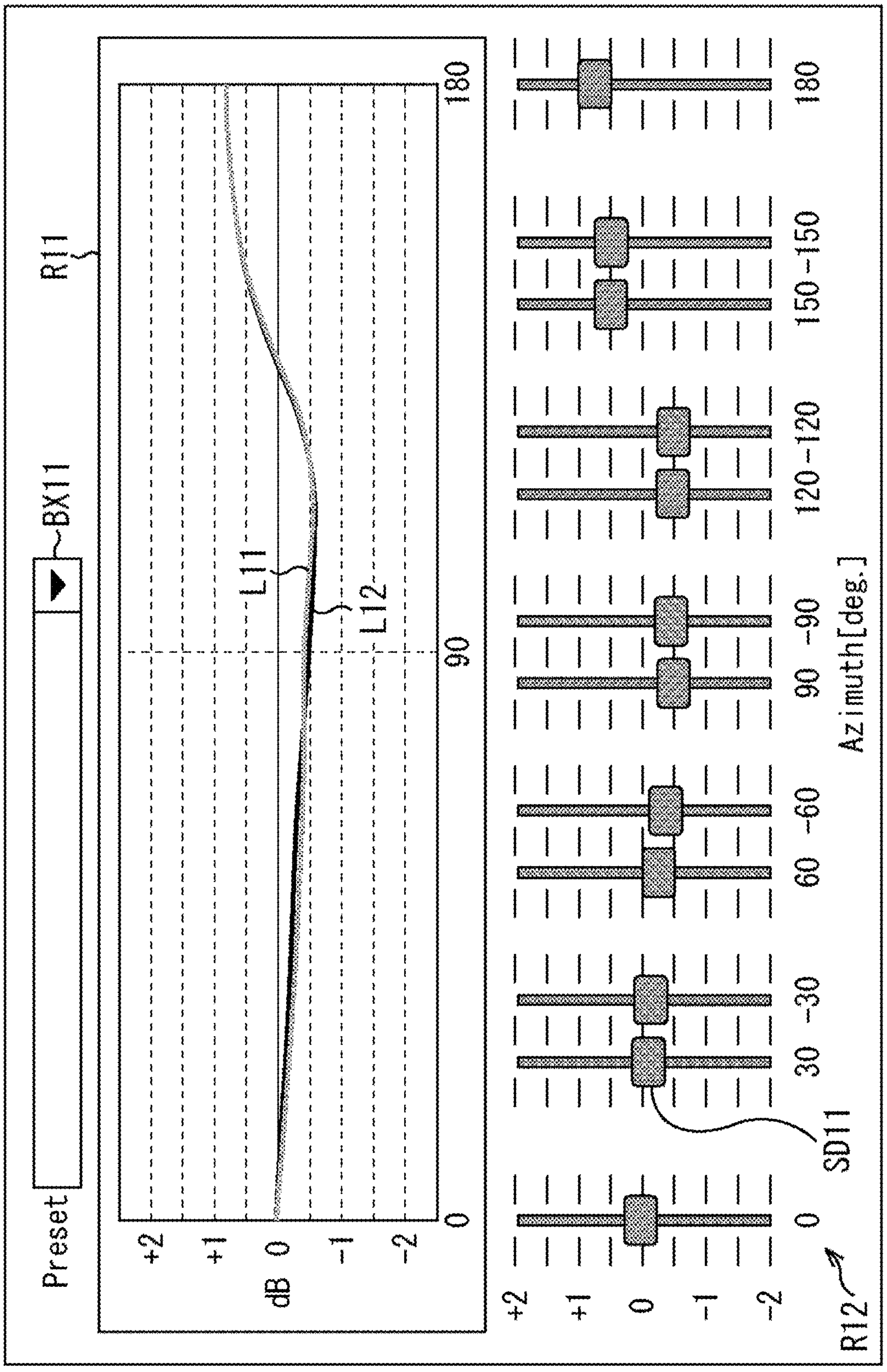
FIG. 8 is a view showing a display screen example of a content creation tool.

Specifically, in the 3D audio content creation tool, by the user interface (display screen) shown in FIG. 8, for example, it is possible to perform setting or adjustment of the gain correction value (gain value) based on the auditory property with respect to the direction of the object viewed from the listener.

In the example shown in FIG. 8, the display screen of the 3D audio content creation tool is provided with a pull-down box BX11 for selecting a desired auditory property from among a plurality of preset auditory properties different from one another.

In this example, a plurality of two-dimensional auditory properties such as an auditory property of a male, an auditory property of a female, and an auditory property of an individual user is prepared in advance, and the user can select a desired auditory property by operating the pull-down box BX11.

When an auditory property is selected by the user, a gain correction value at each azimuth value in accordance with the auditory property selected by the user is displayed in a gain correction value display region R11 provided below the pull-down box BX11 in the figure.

In particular, in the gain correction value display region R11, the vertical axis represents the gain correction value, and the horizontal axis represents the azimuth value.

Furthermore, a curve L11 indicates the gain correction value at each azimuth value in which the azimuth value is a negative value, that is, in the right direction as viewed from the listener, and a curve L12 indicates the gain correction value at each azimuth value in the left direction as viewed from the listener.

The user can intuitively and instantaneously grasp the gain correction value at each azimuth value by viewing such the gain correction value display region R11.

Moreover, a slider display region R12 in which a slider or the like for adjusting the gain correction value displayed on the gain correction value display region R11 is displayed is provided on the lower side of the gain correction value display region R11 in the figure.

In the slider display region R12, for each azimuth value for which the user can adjust the gain correction value, a number indicating the azimuth value, a scale indicating the gain correction value, and the slider for adjusting the gain correction value are displayed.

For example, a slider SD11 is for adjusting the gain correction value when the azimuth value is 30 degrees, and the user can designate a desired value as the adjusted gain correction value by moving the slider SD11 up and down.

When the gain correction value is adjusted with the slider SD11, the display of the gain correction value display region R11 is updated in accordance with the adjustment. That is, here, the curve L12 changes in accordance with the operation on the slider SD11.

Thus, in the example shown in FIG. 8, it is possible to adjust independently the gain correction value in each direction on the right side as viewed from the listener and the gain correction value in each direction on the left side as viewed from the listener.

In particular, in this example, by selecting a discretionary one from the plurality of auditory properties prepared in advance, it is possible to designate a gain correction value in accordance with a desired auditory property, that is, an auditory property table. Then, by operating the slider, it is possible to further adjust the gain correction value in accordance with the selected auditory property.

For example, since the auditory property prepared in advance is an average one, by operating the slider, the user can adjust the gain correction value in accordance with the auditory property of the individual user. Furthermore, by adjusting the gain correction value by operating the slider, it is also possible to perform adjustment according to the user's intention, such as enhancing the rearward object by performing a large gain correction.

When the gain correction value in each azimuth value is thus set and adjusted and, for example, a save button not illustrated or the like is operated, a two-dimensional auditory property table in which the gain correction value displayed in the gain correction value display region R11 and each azimuth value are associated with each other is generated.

Note that in FIG. 8, the example in which the gain correction value is different in each direction on the right side and the left side as viewed from the listener, that is, an example in which the gain correction value is bilaterally asymmetric has been described. However, the gain correction value may be bilaterally symmetric.

Figure 9:
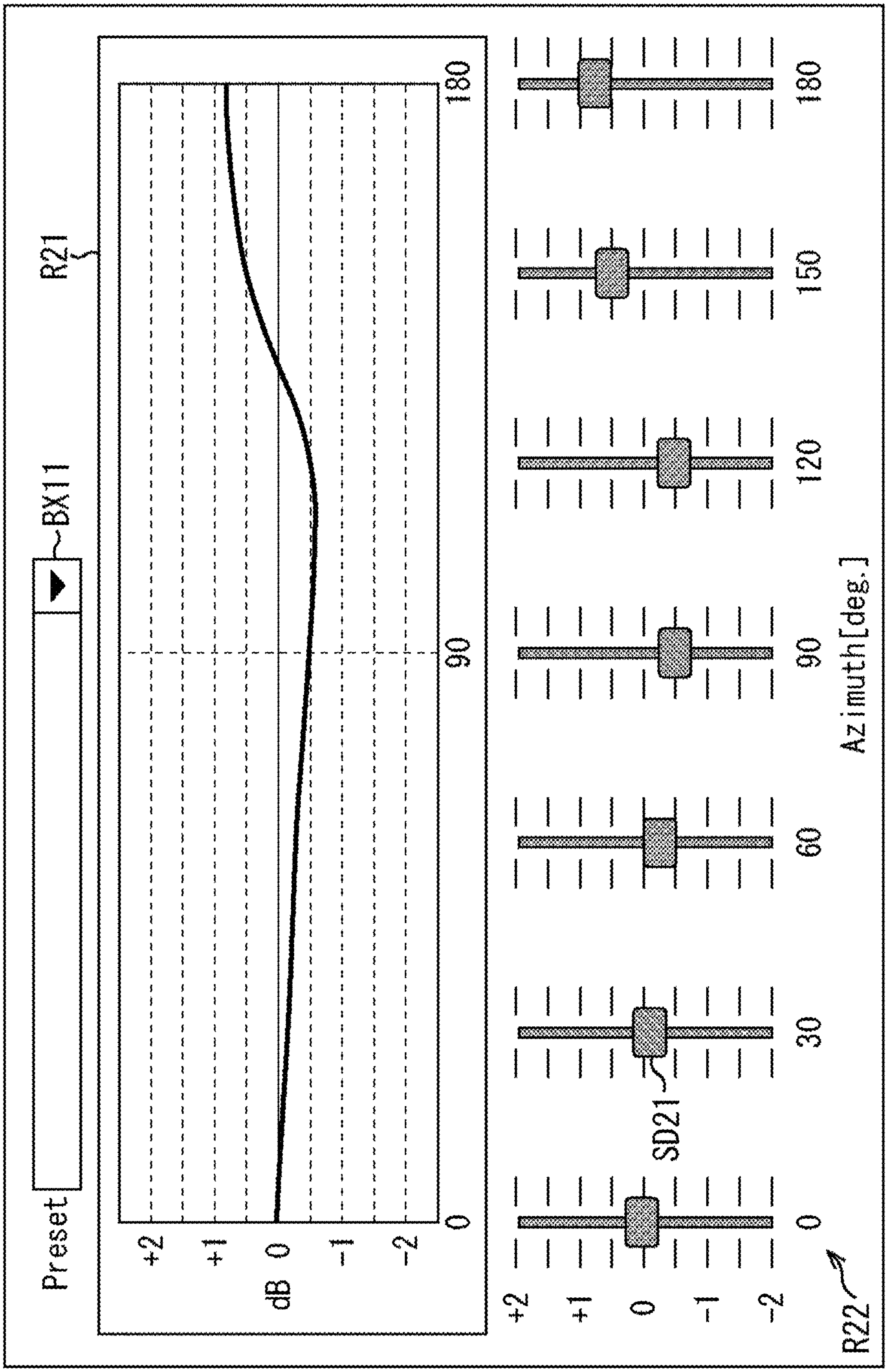
FIG. 9 is a view showing a display screen example of a content creation tool.

In such a case, the gain correction value is set and adjusted as shown in FIG. 9, for example. Note that in FIG. 9, parts corresponding to those in FIG. 8 are given the same reference numerals, and description thereof will be omitted as appropriate.

FIG. 9 shows a display screen of the 3D audio content creation tool, and in this example, the pull-down box BX11, a gain correction value display region R21, and a slider display region R22 are displayed on the display screen.

In the gain correction value display region R21, the gain correction value at each azimuth value is displayed similarly to the gain correction value display region R11 in FIG. 8. However, here, since the gain correction values in each direction on the left side and the right side are common, only one curve indicating the gain correction value is displayed.

For example, the mean value of the gain correction values in each direction on the left side and the right side can be a gain correction value commonalized in the left and right. In this case, for example, the mean value of the gain correction values having the azimuth value of 90 degrees and the azimuth value of −90 degrees in the example of FIG. 8 is set as the common gain correction value having the azimuth value of ±90 degrees in the example of FIG. 9.

Furthermore, a slider or the like for adjusting the gain correction value displayed in the gain correction value display region R21 is displayed in the slider display region R22.

For example, in this example, by moving a slider SD21 up and down, the user can adjust the common gain correction value having the azimuth value of ±30 degrees.

Figure 10:
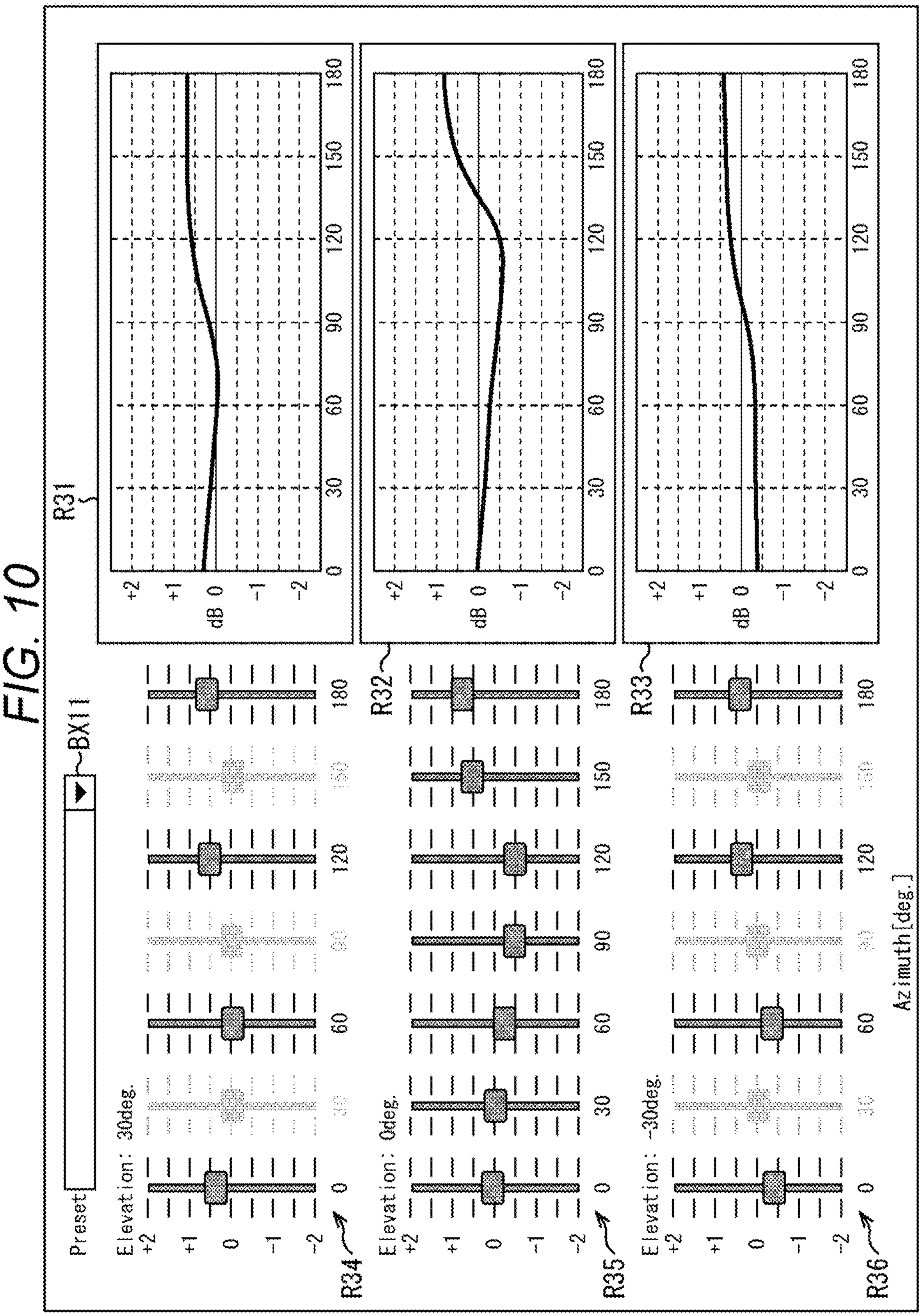
FIG. 10 is a view showing a display screen example of a content creation tool.

Moreover, the gain correction value at each azimuth value may be adjusted for each elevation value, as shown in FIG. 10, for example. Note that in FIG. 10, parts corresponding to those in FIG. 8 are given the same reference numerals, and description thereof will be omitted as appropriate.

FIG. 10 shows a display screen of the 3D audio content creation tool, and in this example, the pull-down box BX11, a gain correction value display region R31 to a gain correction value display region R33, and a slider display region R34 to a slider display region R36 are displayed on the display screen.

In the example shown in FIG. 10, the gain correction value is bilaterally symmetric similarly to the example shown in FIG. 9.

The gain correction value at each azimuth value when the elevation value is 30 degrees is displayed in the gain correction value display region R31, and the user can adjust the gain correction values by operating the slider or the like displayed in the slider display region R34.

Similarly, the gain correction value at each azimuth value when the elevation value is 0 degrees is displayed in the gain correction value display region R32, and the user can adjust the gain correction values by operating the slider or the like displayed in the slider display region R35.

Furthermore, the gain correction value at each azimuth value when the elevation value is −30 degrees is displayed in the gain correction value display region R33, and the user can adjust the gain correction values by operating the slider or the like displayed in the slider display region R36.

When the gain correction value in each azimuth value is thus set and adjusted and, for example, a save button not illustrated or the like is operated, a three-dimensional auditory property table in which the gain correction value, the elevation value, and the azimuth value are associated with one another is generated.

Figure 11:
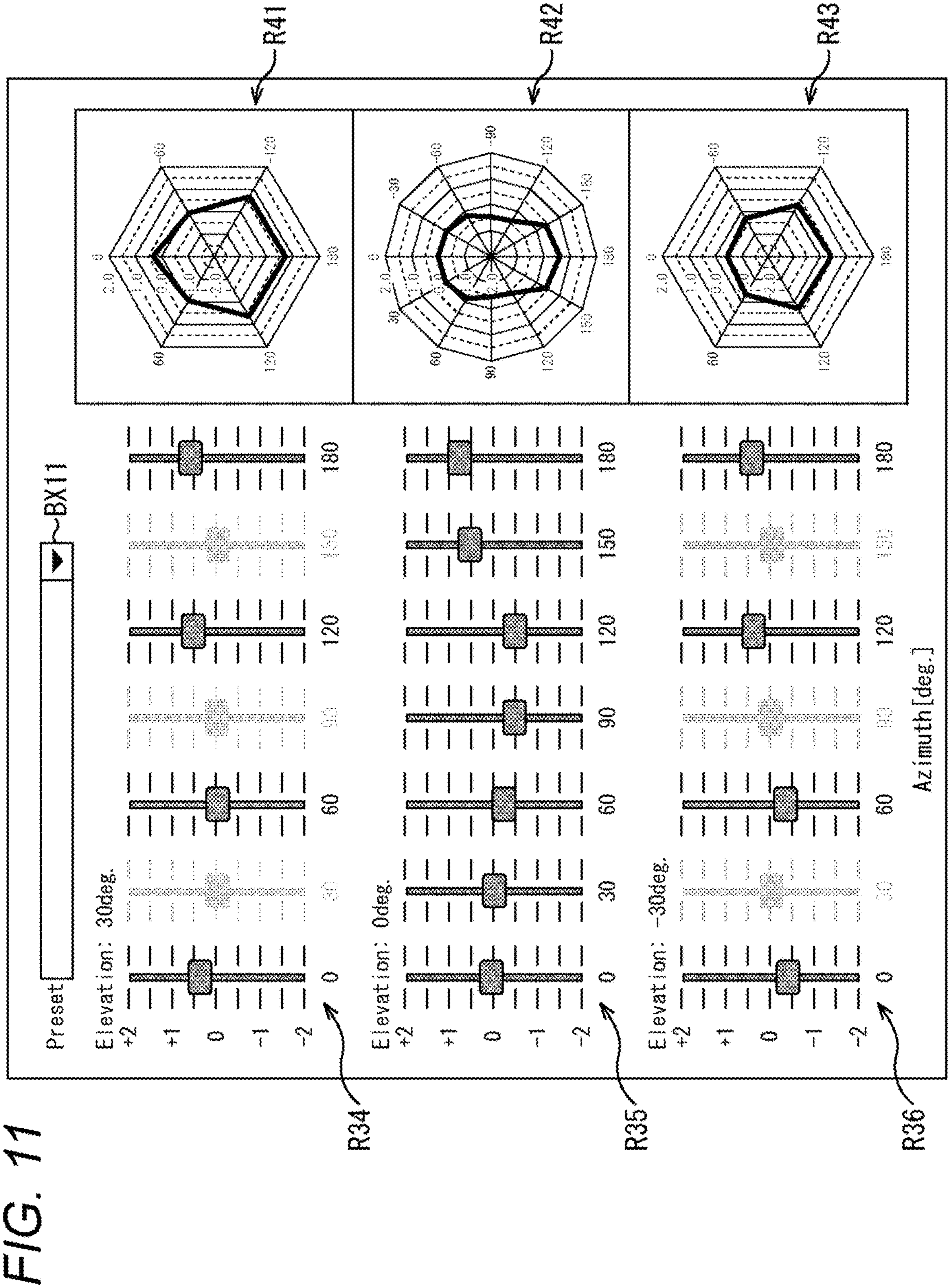
FIG. 11 is a view showing a display screen example of a content creation tool.

Moreover, as another example of the display screen of the 3D audio content creation tool, a gain correction value display region of a radar chart type may be provided as shown in FIG. 11. Note that in FIG. 11, parts corresponding to those in FIG. 10 are given the same reference numerals, and description thereof will be omitted as appropriate.

In the example of FIG. 11, the pull-down box BX11, a gain correction value display region R41 to a gain correction value display region R43, and the slider display region R34 to the slider display region R36 are displayed on the display screen. In this example, the gain correction value is bilaterally symmetric similarly to the example shown in FIG. 10.

The gain correction value at each azimuth value when the elevation value is 30 degrees is displayed in the gain correction value display region R41, and the user can adjust the gain correction values by operating the slider or the like displayed in the slider display region R34.

In the gain correction value display region R41 in particular, since each item of the radar chart is the azimuth value, the user can instantaneously grasp not only each direction (azimuth value) and the gain correction values in those directions but also the relative difference in the gain correction values among the directions.

Similarly to the gain correction value display region R41, the gain correction value at each azimuth value when the elevation value is 0 degrees is displayed in the gain correction value display region R42. Furthermore, the gain correction value at each azimuth value when the elevation value is −30 degrees is displayed in the gain correction value display region R43.

<Configuration Example of Information Processing Device>

Next, an information processing device that generates an auditory property table by the 3D audio content creation tool described with reference to FIG. 8 and the like will be described.

Figure 12:
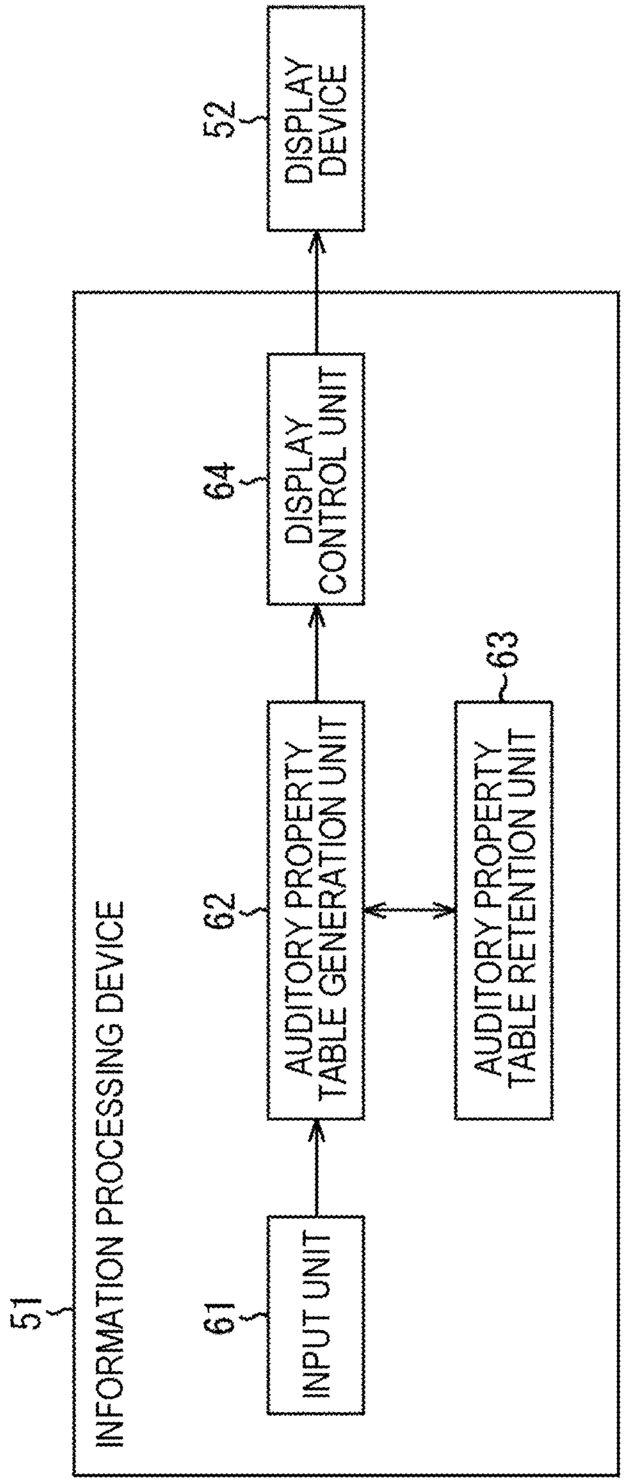
FIG. 12 is a view showing a configuration example of an information processing device.

Such an information processing device is configured as shown in FIG. 12, for example.

An information processing device 51 shown in FIG. 12 implements a content creation tool, and causes a display device 52 to display a display screen of the content creation tool.

The information processing device 51 has an input unit 61, an auditory property table generation unit 62, an auditory property table retention unit 63, and a display control unit 64.

The input unit 61 includes, for example, a mouse, a keyboard, a switch, a button, and a touchscreen, and supplies an input signal corresponding to a user operation to the auditory property table generation unit 62.

The auditory property table generation unit 62 generates a new auditory property table on the basis of the input signal supplied from the input unit 61 and the auditory property table of the preset auditory property retained in the auditory property table retention unit 63, and supplies the new auditory property table to the auditory property table retention unit 63.

Furthermore, the auditory property table generation unit 62 appropriately instructs the display control unit 64, for example, to update the display of the display screen in the display device 52 at the time of generating the auditory property table.

The auditory property table retention unit 63 retains an auditory property table of an auditory property preset in advance, supplies the auditory property table to the auditory property table generation unit 62 as appropriate, and retains the auditory property table supplied from the auditory property table generation unit 62.

The display control unit 64 controls display of the display screen by the display device 52 in accordance with the instruction from the auditory property table generation unit 62.

Note that the input unit 61, the auditory property table generation unit 62, and the display control unit 64 shown in FIG. 12 may be provided in the information processing device 11 shown in FIG. 4.

<Explanation of Table Generation Processing>

Subsequently, the operation of the information processing device 51 will be described.

Figure 13:
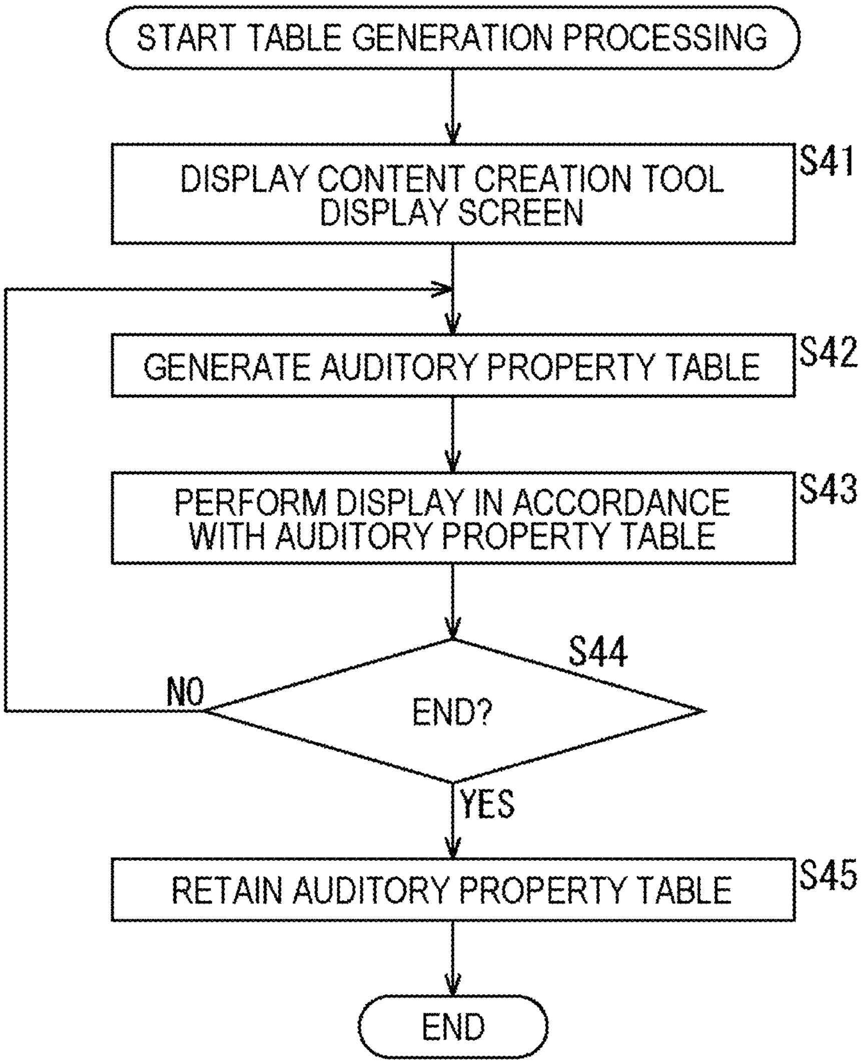
FIG. 13 is a flowchart explaining table generation processing.

That is, the table generation processing performed by the information processing device 51 will be described below with reference to the flowchart of FIG. 13.

In step S41, the display control unit 64 causes the display device 52 to display the display screen of the content creation tool in response to the instruction of the auditory property table generation unit 62.

Specifically, for example, the display control unit 64 causes the display device 52 to display the display screen shown in FIGS. 8, 9, 10, 11, and the like.

At this time, for example, in a case where the user operates the input unit 61 and selects the preset auditory property, the auditory property table generation unit 62 reads, from the auditory property table retention unit 63, the auditory property table corresponding to the auditory property selected by the user in response to the input signal supplied from the input unit 61.

The auditory property table generation unit 62 instructs the display control unit 64 to display the gain correction value display region so that the gain correction value of each azimuth value indicated by the auditory property table having been read is displayed on the display device 52. In response to the instruction of the auditory property table generation unit 62, the display control unit 64 causes the display screen of the display device 52 to display the gain correction value display region.

When the display screen of the content creation tool is displayed on the display device 52, the user appropriately operates the input unit 61 and operates the slider or the like displayed in the slider display region, thereby instructing a change (adjustment) of the gain correction value.

Then, in step S42, the auditory property table generation unit 62 generates the auditory property table in accordance with the input signal supplied from the input unit 61.

That is, the auditory property table generation unit 62 changes, in accordance with the input signal supplied from the input unit 61, the auditory property table read from the auditory property table retention unit 63, thereby generating a new auditory property table. That is, the preset auditory property table is changed (updated) in accordance with the operation of the slider or the like displayed in the slider display region.

Thus, when the gain correction value of each azimuth value is adjusted (changed) in accordance with the operation of the slider or the like and a new auditory property table is generated, the auditory property table generation unit 62 instructs the display control unit 64 to update the display of the gain correction value display region in accordance with the new auditory property table.

In step S43, the display control unit 64 controls the display device 52 in accordance with the instruction of the auditory property table generation unit 62, and performs display in accordance with the newly generated auditory property table.

Specifically, the display control unit 64 updates the display of the gain correction value display region on the display screen of the display device 52 in accordance with the newly generated auditory property table.

In step S44, the auditory property table generation unit 62 determines whether or not to end the processing on the basis of the input signal supplied from the input unit 61.

For example, the auditory property table generation unit 62 determines to end the processing, in a case where a signal indicative of instructing to save the auditory property table is supplied as an input signal when the user operates the input unit 61 and operates the save button or the like displayed on the display device 52.

In a case where it is determined in step S44 not to end the processing, the processing returns to step S42, and the above-described processing is repeatedly performed.

On the other hand, in a case where it is determined in step S44 to end the processing, the processing proceeds to step S45.

In step S45, the auditory property table generation unit 62 supplies the auditory property table obtained in the most recently performed step S42 to the auditory property table retention unit 63 as a newly generated auditory property table, and causes the auditory property table retention unit 63 to retain the newly generated auditory property table.

When the auditory property table is retained in the auditory property table retention unit 63, the table generation processing ends.

As described above, the information processing device 51 causes the display device 52 to display the display screen of the content creation tool, and adjusts the gain correction value in accordance with the user operation, thereby generating a new auditory property table.

This allows the user to easily and intuitively obtain an auditory property table corresponding to a desired auditory property. Therefore, the user can create 3D audio contents of sufficiently high quality more easily, i.e., in a short time.

Third Embodiment

<Configuration Example of Voice Processing Device>

Furthermore, for example, in a free viewpoint content, since the position of the listener in the three-dimensional space can be freely moved, the relative positional relationship between the object in the three-dimensional space and the listener also changes with the movement of the listener.

A technology in which, in a case where the position of the listener can be freely moved as described above, the sound source position is corrected in accordance with a change in the position of the listener, and rendering processing is performed on the basis of the resultant correction position information has been proposed (see, WO2015/107926, for example).

The present technology is also applicable to a reproduction device that reproduces contents of such a free viewpoint. In such a case, the gain correction is performed using not only the correction position information but also the three-dimensional auditory property described above.

Figure 14:
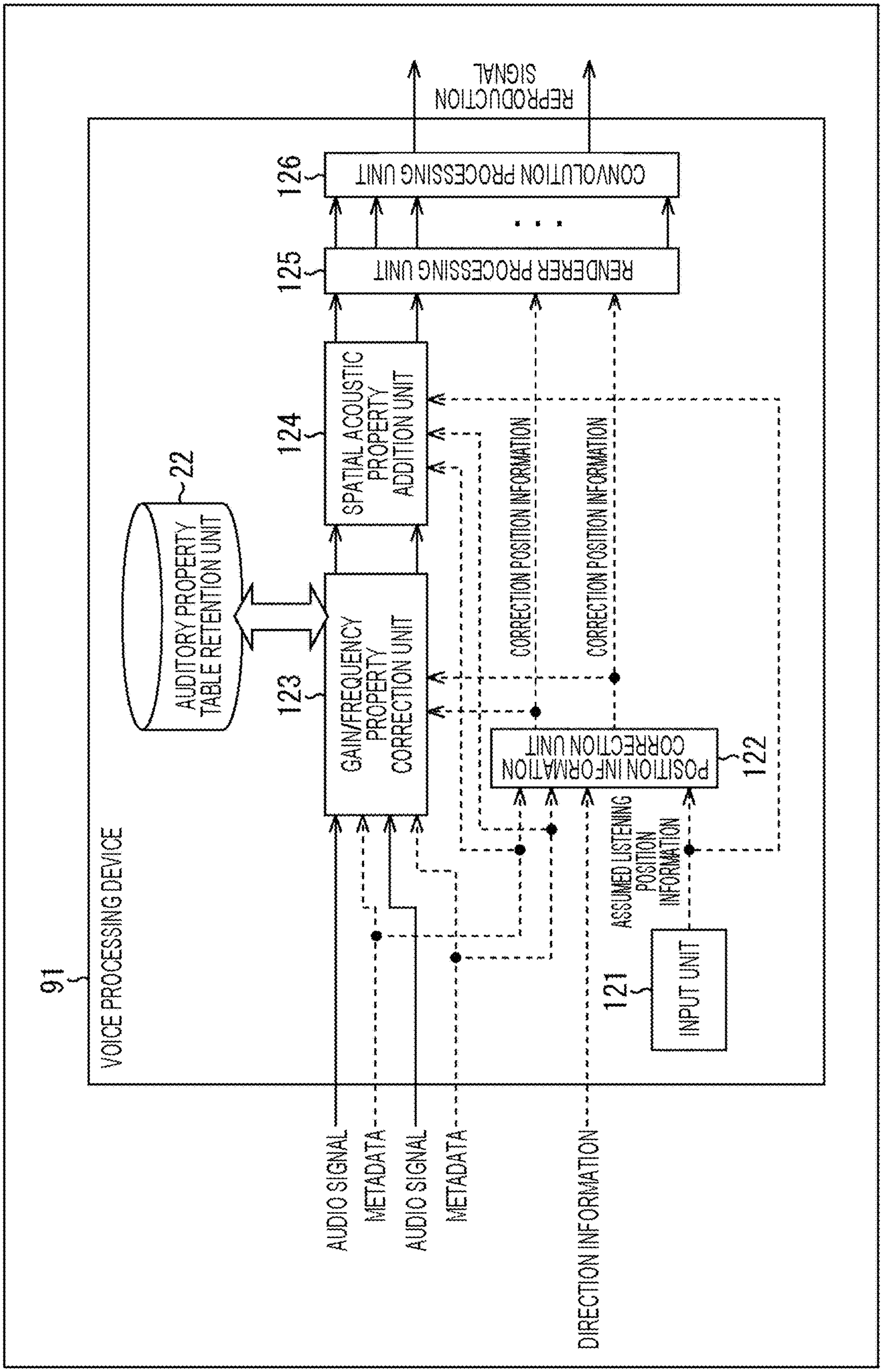
FIG. 14 is a view showing a configuration example of a voice processing device.

FIG. 14 is a view showing a configuration example of an embodiment of a voice processing device functioning as a reproduction device that reproduces contents of a free viewpoint to which the present technology is applied. Note that in FIG. 14, parts corresponding to those in FIG. 4 are given the same reference numerals, and description thereof will be omitted as appropriate.

A voice processing device 91 shown in FIG. 14 has an input unit 121, a position information correction unit 122, a gain/frequency property correction unit 123, the auditory property table retention unit 22, a spatial acoustic property addition unit 124, a renderer processing unit 125, and a convolution processing unit 126.

The voice processing device 91 is supplied with an audio signal of the object and metadata of the audio signal for each object as audio information of the content to be reproduced. Note that in FIG. 14, an example in which audio signals and metadata of two objects are supplied to the information processing device 91 will be described, but the present invention is not limited thereto, and the number of objects may be any number.

Here, the metadata supplied to the voice processing device 91 is the position information of the object and the gain initial value.

Furthermore, the position information includes the azimuth value, the elevation value, and the radius value described above, and is information indicating the position of the object viewed from the reference position in the three-dimensional space, that is, the localization position of the sound of the object. Note that hereinafter, the reference position in the three-dimensional space is also referred to as a standard listening position, in particular.

The input unit 121 includes a mouse, a button, a touchscreen and the like, and when operated by the user, outputs a signal in accordance with the operation. For example, the input unit 121 accepts an input of an assumed listening position by the user, and supplies, to the position information correction unit 122 and the spatial acoustic property addition unit 124, assumed listening position information indicating the assumed listening position input by the user.

Here, the assumed listening position is the listening position of the sound constituting the content in a virtual sound field desired to reproduce. Therefore, it can be said that the assumed listening position indicates the position after the change when a predetermined standard listening position is changed (corrected).

On the basis of the assumed listening position information supplied from the input unit 121 and the direction information indicating the orientation of the listener supplied from the outside, the position information correction unit 122 corrects the position information as the metadata of the object supplied from the outside.

The position information correction unit 122 supplies the correction position information obtained by the correction of the position information to the gain/frequency property correction unit 123 and the renderer processing unit 125.

Note that the direction information can be obtained from a gyro sensor or the like provided on the head of the user (listener), for example. Furthermore, the correction position information is information indicating the position of the object viewed from the listener who is present at the assumed listening position and facing the direction indicated by the direction information, that is, the localization position of the sound of the object.

On the basis of the correction position information supplied from the position information correction unit 122, the auditory property table retained in the auditory property table retention unit 22, and the metadata supplied from the outside, the gain/frequency property correction unit 123 performs gain correction and frequency property correction on the audio signal of the object supplied from the outside.

The gain/frequency property correction unit 123 supplies the audio signal obtained by the gain correction and the frequency property correction to the spatial acoustic property addition unit 124.

On the basis of the assumed listening position information supplied from the input unit 121 and the position information of the object supplied from the outside, the spatial acoustic property addition unit 124 adds a spatial acoustic property to the audio signal supplied from the gain/frequency property correction unit 123 and supplies it to the renderer processing unit 125.

On the basis of the correction position information supplied from the position information correction unit 122, the renderer processing unit 125 performs rendering processing on the audio signal supplied from the spatial acoustic property addition unit 124, that is, mapping processing, and generates a reproduction signal of M channels of 2 or more.

That is, an M-channel reproduction signal is generated from the audio signal of each object. The renderer processing unit 125 supplies the generated M-channel reproduction signal to the convolution processing unit 126.

The thus obtained M-channel reproduction signal is an audio signal that reproduces the sound output from each object, which is listed at the assumed listening position of the virtual sound field desired to reproduce by reproducing with virtual M speakers (M-channel speaker).

The convolution processing unit 126 performs convolution processing on the M-channel reproduction signal supplied from the renderer processing unit 125, and generates and outputs a 2-channel reproduction signal.

That is, in this example, the equipment on the reproduction side of the content is a headphone, and the convolution processing unit 126 generates and outputs a reproduction signal to be reproduced by two speakers (drivers) provided in the headphone.

<Explanation of Reproduction Signal Generation Processing>

Subsequently, the operation of the voice processing device 91 will be described.

Figure 15:
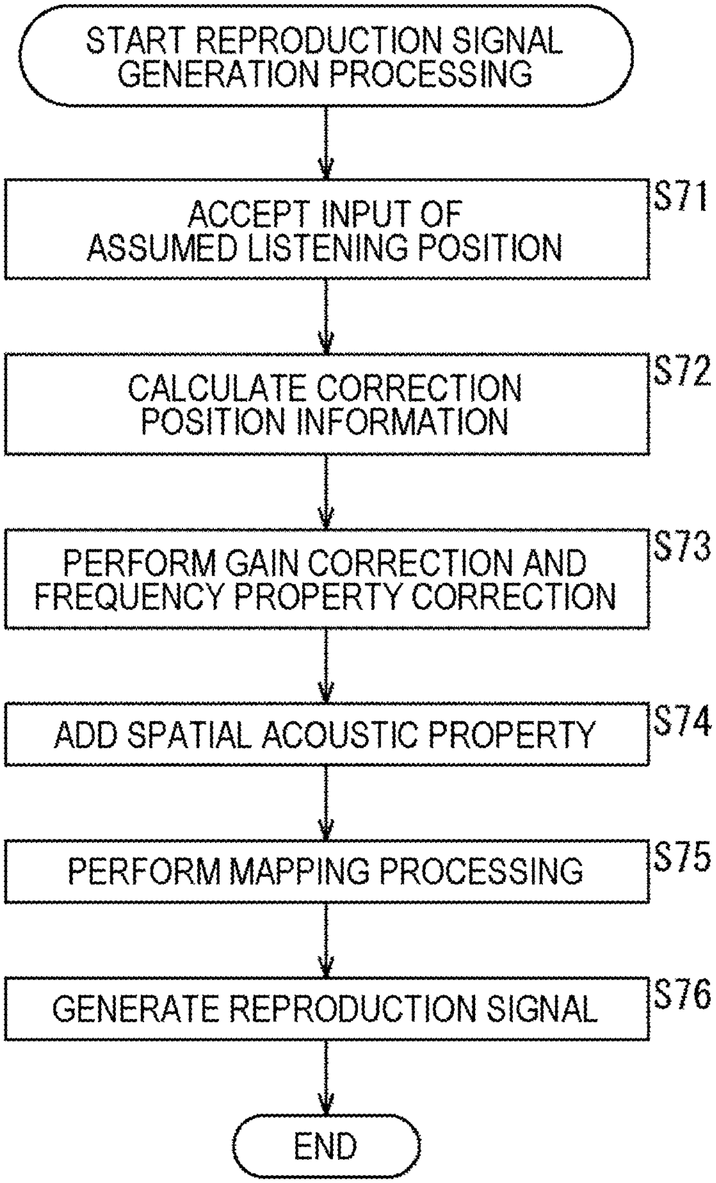
FIG. 15 is a flowchart explaining reproduction signal generation processing.

That is, the reproduction signal generation processing performed by the voice processing device 91 will be described below with reference to the flowchart of FIG. 15.

In step S71, the input unit 121 accepts an input of the assumed listening position.

When the user operates the input unit 121 and inputs the assumed listening position, the input unit 121 supplies, to the position information correction unit 122 and the spatial acoustic property addition unit 124, the assumed listening position information indicating the assumed listening position.

On the basis of the assumed listening position information supplied from the input unit 121 and the position information and the direction information of the object supplied from the outside, the position information correction unit 122 calculates in step S72 the correction position information.

The position information correction unit 122 supplies the correction position information obtained for each object to the gain/frequency property correction unit 123 and the renderer processing unit 125.

On the basis of the correction position information supplied from the position information correction unit 122, the metadata supplied from the outside, and the auditory property table retained in the auditory property table retention unit 22, the gain/frequency property correction unit 123 performs in step S73 gain correction and frequency property correction on the audio signal of the object supplied from the outside.

Specifically, for example, the gain/frequency property correction unit 123 reads, from the auditory property table, the gain correction value associated with the azimuth value, the elevation value, and the radius value constituting the correction position information.

Furthermore, the gain/frequency property correction unit 123 corrects the gain correction value by multiplying the gain correction value by the ratio between the radius value of the position information supplied as metadata and the radius value of the correction position information, and obtains the gain value by correcting the gain initial value by the resultant gain correction value.

Thus, the gain correction in accordance with the direction of the object viewed from the assumed listening position and the gain correction in accordance with the distance from the assumed listening position to the object are implemented by the gain correction with the gain value.

Furthermore, the gain/frequency property correction unit 123 selects a filter coefficient on the basis of the radius value of the position information supplied as metadata and the radius value of the correction position information.

The thus selected filter coefficient is used for filter processing for achieving a desired frequency property correction. More specifically, for example, the filter coefficient is for reproducing a property in which a high-frequency component of a sound from the object attenuates by the wall or the ceiling of the virtual sound field desired to reproduce in accordance with the distance from the assumed listening position to the object.

The gain/frequency property correction unit 123 implements gain correction and frequency property correction by performing gain correction and filter processing on the audio signal of the object on the basis of the filter coefficient and the gain value obtained as described above.

The gain/frequency property correction unit 123 supplies, to the spatial acoustic property addition unit 124, the audio signal of each object obtained by the gain correction and the frequency property correction.

On the basis of the assumed listening position information supplied from the input unit 121 and the position information of the object supplied from the outside, the spatial acoustic property addition unit 124 adds in step S74 the spatial acoustic property to the audio signal supplied from the gain/frequency property correction unit 123 and supplies it to the renderer processing unit 125.

For example, the spatial acoustic property addition unit 124 adds a spatial acoustic property by performing multi-tap delay processing, comb filter processing, and all-pass filter processing on the audio signal on the basis of a delay amount and a gain amount determined from the position information of the object and the assumed listening position information.

Thus, initial reflection, reverberation property, and the like are added to the audio signal as spatial acoustic properties, for example.

In step S75, the renderer processing unit 125 performs mapping processing on the audio signal supplied from the spatial acoustic property addition unit 124 on the basis of the correction position information supplied from the position information correction unit 122, thereby generating an M-channel reproduction signal and supplying it to the convolution processing unit 126.

For example, in the processing of step S75, a reproduction signal is generated by VBAP, but an M-channel reproduction signal may be generated by any method.

In step S76, the convolution processing unit 126 performs convolution processing on the M-channel reproduction signal supplied from the renderer processing unit 125, thereby generating and outputting a 2-channel reproduction signal. For example, binaural room impulse response (BRIR) processing is performed as convolution processing.

When the 2-channel reproduction signal is generated and output, the reproduction signal generation processing ends.

As described above, the voice processing device 91 calculates the correction position information on the basis of the assumed listening position information, performs gain correction and frequency property correction on the audio signal of each object on the basis of the obtained correction position information and assumed listening position information, and adds a spatial acoustic property.

This makes it possible to perform an appropriate gain correction and frequency property correction more easily. Furthermore, it is possible to realistically reproduce how the listener hears the sound output from each object at a discretionary assumed listening position. Therefore, the user becomes able to freely designate the listening position in accordance with his preference at the time of reproducing the content, and can achieve audio reproduction with a higher degree of freedom.

Note that in step S73, in addition to performing the gain correction and the frequency property correction in accordance with the distance from the assumed listening position to the object on the basis of the correction position information, the gain correction based on the three-dimensional auditory property is also performed using the auditory property table.

At this time, the auditory property table used in step S73 is, for example, the one shown in FIG. 16.

The auditory property table shown in FIG. 16 is obtained by inverting the sign of the gain correction value in the auditory property table shown in FIG. 6.

By correcting the gain initial value using such an auditory property table, it is possible to reproduce, by gain correction, a phenomenon that the loudness of the sound on the auditory sensation changes depending on the arrival direction of the sound from even the same object (sound source). This makes it possible to achieve a sound field reproduction with higher reality.

On the other hand, depending on the reproduction condition, a more appropriate gain correction is sometimes achieved by using the auditory property table shown in FIG. 6 rather than the auditory property table shown in FIG. 16.

That is, for example, a case where speaker reproduction using an actual speaker arranged in a three-dimensional space is performed instead of using a headphone for content reproduction will be considered.

In this case, in the voice processing device 91, the M-channel reproduction signal obtained by the renderer processing unit 125 is supplied to the speaker corresponding to each of the M channels, and the sound of the content is reproduced.

In the content reproduction using such an actual speaker, the sound source, that is, the sound of the object is actually reproduced at the position of the object viewed from the assumed listening position.

Therefore, it is unnecessary to perform gain correction to reproduce a phenomenon that the loudness of the sound on the auditory sensation changes depending on the arrival direction of the sound, and rather, it is sometimes not desired to change the loudness of the sound on the auditory sensation so as not to change the volume balance.

In such a case, in step S73, the gain correction value is only required to be decided using the auditory property table shown in FIG. 6, and the gain initial value is only required to be corrected using the gain correction value. Thus, gain correction is performed such that the loudness of the sound on the auditory sensation becomes constant regardless of the direction of the presence of the object.

Variation 1 of Third Embodiment

<Code Transmission of Gain Auditory Property Information>

Incidentally, an audio signal, metadata, and the like are sometimes encoded and transmitted by a coded bitstream.

In such a case, for example, the gain/frequency property correction unit 123 can transmit, by the coded bitstream, the gain auditory property information including flag information and the like as to whether or not to perform gain correction using the auditory property table.

At this time, it is possible for the gain auditory property information to include not only the flag information but also an auditory property table, index information indicating the auditory property table used for gain correction among a plurality of auditory property tables, and the like.

The syntax for such gain auditory property information can be one shown in FIG. 17, for example.

In the example of FIG. 17, the characters "numGainAuditoryPropertyTables" indicate the number of auditory property tables transmitted by the coded bitstream, that is, the number of auditory property tables included in the gain auditory property information.

Furthermore, the characters "numElements[i]" indicate the number of elements constituting the i-th auditory property table included in the gain auditory property information.

The elements mentioned here are the azimuth value, the elevation value, the radius value, and the gain correction value associated with one another.

Furthermore, the characters "azimuth[i][n]", "elevation[i][n]", and "radius[i][n]" indicate the azimuth value, the elevation value, and the radius value constituting the n-th element of the i-th auditory property table.

In other words, azimuth[i][n], elevation[i][n], and radius[i][n] indicate the arrival direction of the sound of the object that is the sound source, that is, the horizontal angle, the vertical angle, and the distance (radius) indicating the position of the object.

Furthermore, the characters "gainCompensValue[i][n]" indicate the gain correction value constituting the n-th element of the i-th auditory property table, that is, the gain correction value with respect to the position (direction) indicated by azimuth[i][n], elevation[i][n], and radius[i][n].

Moreover, the characters “hasGainCompensObjects” are flag information indicating whether or not there is an object for which gain correction using the auditory property table is to be performed.

Furthermore, the characters “num_objects” indicate the number of objects (the object number) constituting the contents, and this object number num_objects is transmitted to the device on the reproduction side of the content, that is, the voice processing device, separately from the gain auditory property information.

In a case where the value of the flag information hasGainCompensObjects is a value indicative of presence of an object for which gain correction using the auditory property table is to be performed, the gain auditory property information includes flag information indicated by the characters “isGainCompensObject[o]” by the object number num_objects.

The flag information isGainCompensObject[o] indicates whether or not to perform gain correction using the auditory property table with respect to the o-th object.

Moreover, in a case where the value of the flag information isGainCompensObject[o] is a value indicative of performing the gain correction using the auditory property table, the gain auditory property information includes an index indicated by the characters “applyTableIndex[o]”.

This index applyTableIndex[o] is information indicating the auditory property table used when performing gain correction with respect to the o-th object.

For example, in a case where the number numGainAuditoryPropertyTables of the auditory property tables is 0, the auditory property table is not transmitted, and the gain auditory property information does not include the index applyTableIndex[o]. That is, the index applyTableIndex[o] is not transmitted.

In such a case, for example, the gain correction may be performed using the auditory property table retained in the auditory property table retention unit 22, or the gain correction may not be performed.

<Configuration Example of Voice Processing Device>

Figure 18:
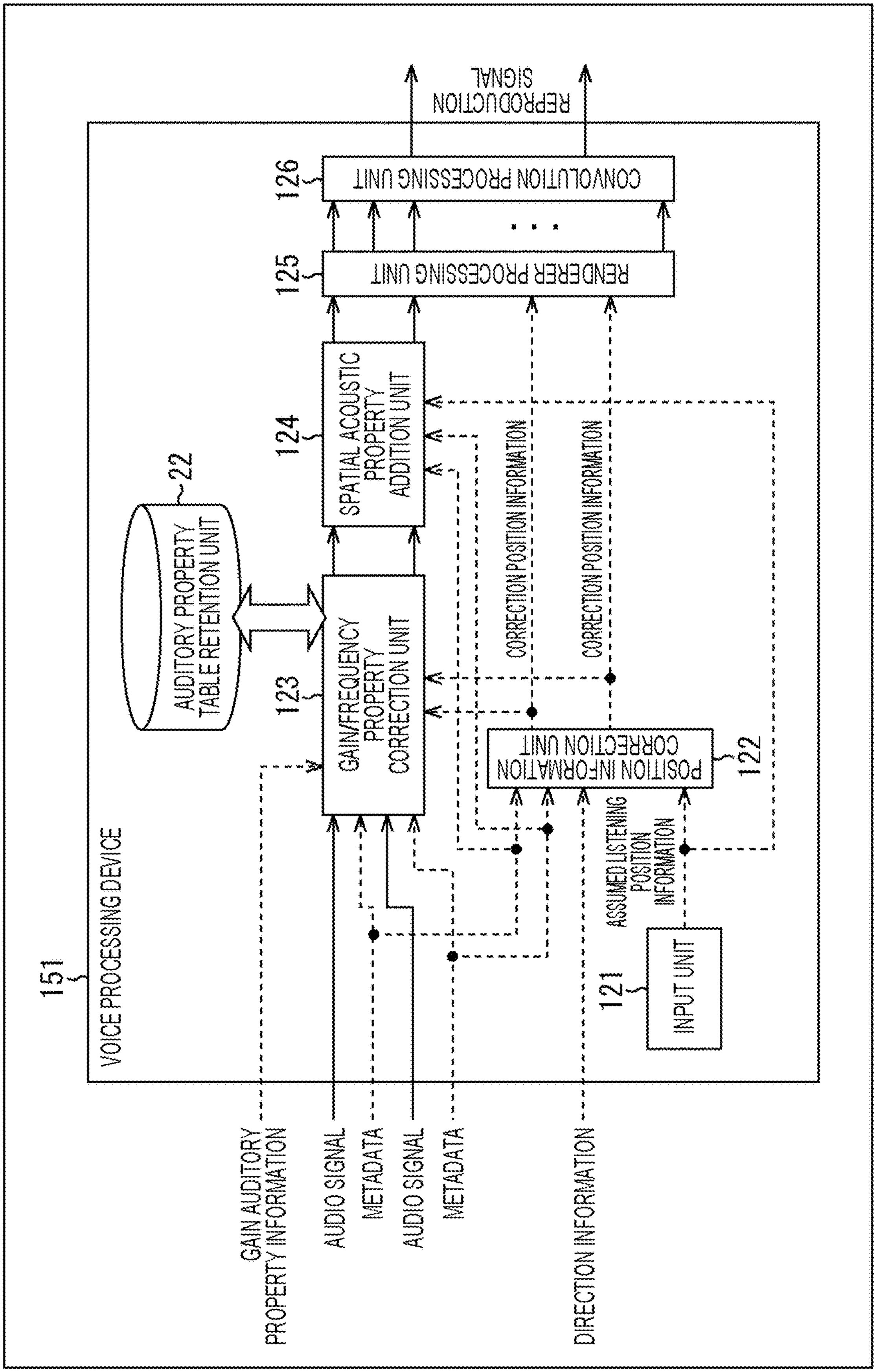
FIG. 18 is a view showing a configuration example of a voice processing device.

In a case where the gain auditory property information as described above is transmitted by the coded bitstream, the voice processing device is configured as shown in FIG. 18, for example. Note that in FIG. 18, parts corresponding to those in FIG. 14 are given the same reference numerals, and description thereof will be omitted as appropriate.

A voice processing device 151 shown in FIG. 18 has the input unit 121, the position information correction unit 122, the gain/frequency property correction unit 123, the auditory property table retention unit 22, the spatial acoustic property addition unit 124, the renderer processing unit 125, and the convolution processing unit 126.

The configuration of the voice processing device 151 is the same as the configuration of the voice processing device 91 shown in FIG. 14, but is different from that of the voice processing device 91 in that the auditory property table or the like read from the gain auditory property information extracted from the coded bitstream is supplied to the gain/frequency property correction unit 123.

That is, in the voice processing device 151, the auditory property table, the flag information hasGainCompensObjects, the flag information isGainCompensObject[o], the index applyTableIndex[o], and the like having read from the gain auditory property information are supplied to the gain/frequency property correction unit 123.

The voice processing device 151 basically performs the reproduction signal generation processing described with reference to FIG. 15.

However, in a case where the number numGainAuditoryPropertyTables of the auditory property tables is 0, that is, in a case where the auditory property table is not supplied from the outside, the gain/frequency property correction unit 123 performs in step S73 gain correction using the auditory property table retained in the auditory property table retention unit 22.

On the other hand, in a case where the auditory property table is supplied from the outside, the gain/frequency property correction unit 123 performs gain correction using the supplied auditory property table.

Specifically, the gain/frequency property correction unit 123 performs gain correction with respect to the o-th object using the auditory property table indicated by the index applyTableIndex[o] among the plurality of auditory property tables supplied from the outside.

However, the gain/frequency property correction unit 123 does not perform the gain correction using the auditory property table for the object of which the value of the flag information isGainCompensObject[o] is a value indicative of not performing the gain correction using the auditory property table.

That is, in a case where the flag information isGainCompensObject[o] of a value indicative of performing the gain correction using the auditory property table is supplied, the gain/frequency property correction unit 123 performs the gain correction using the auditory property table indicated by the index applyTableIndex[o].

Furthermore, for example, in a case where the value of the flag information hasGainCompensObjects is a value indicative of absence of an object for which gain correction using the auditory property table is to be performed, the gain/frequency property correction unit 123 does not perform the gain correction using the auditory property table with respect to the object.

As described above, according to the present technology, it is possible to easily decide the gain information of each object, that is, the gain value in 3D mixing of object audio, reproduction of contents of a free viewpoint, and the like. Therefore, it is possible to perform the gain correction more easily.

Furthermore, according to the present technology, it is possible to appropriately correct a change in volume on auditory sensation accompanying a change in a relative positional relationship between the listener and the object (sound source) when the listening position is changed.

<Configuration Example of Computer>

Incidentally, the series of processing described above can be executed by hardware or can be executed by software. In a case where the series of processing is executed by software, a program constituting the software is installed into a computer. Here, the computer includes a computer incorporated in dedicated hardware and, for example, a general-purpose personal computer capable of executing various functions by installing various programs.

Figure 19:
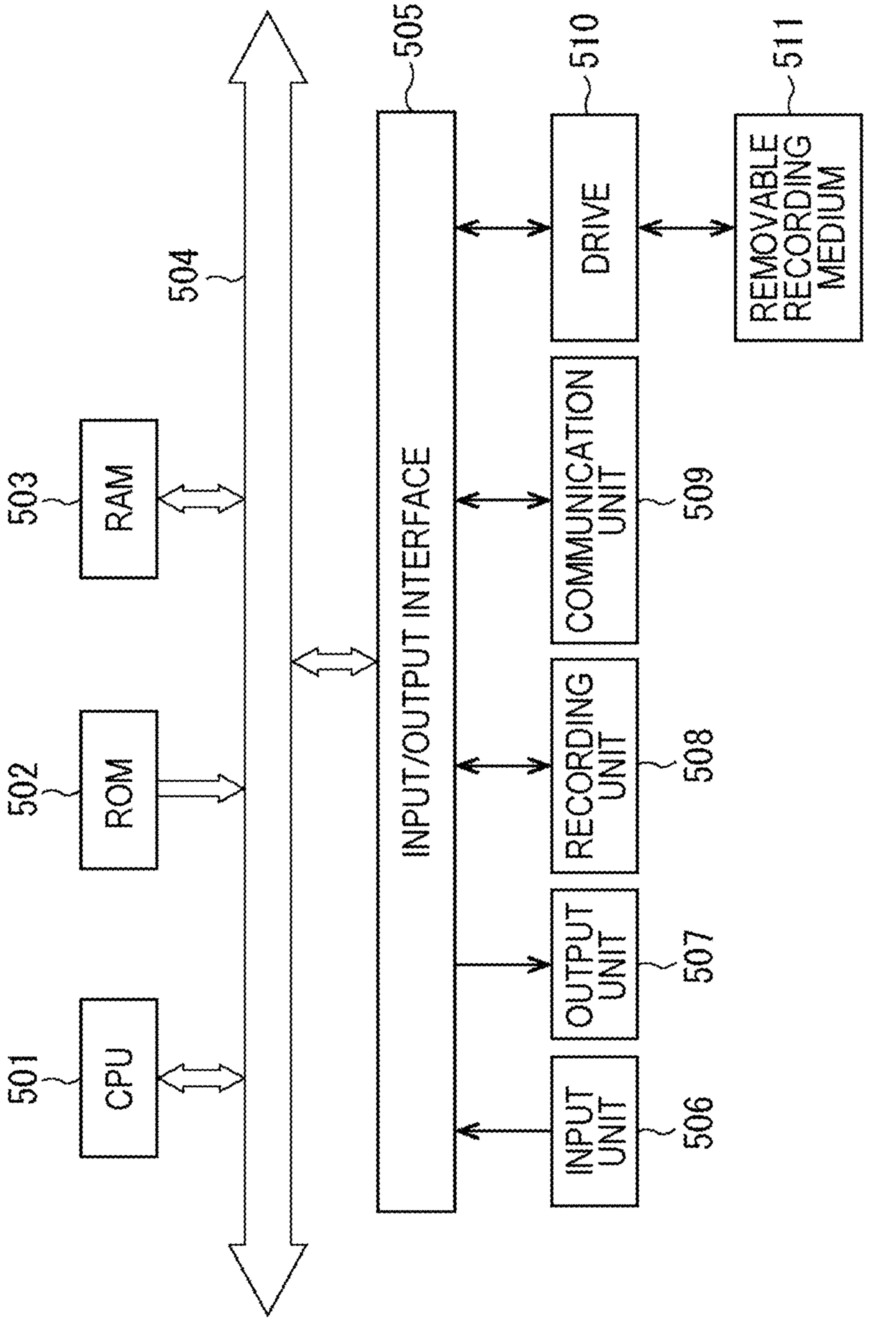
FIG. 19 is a view showing a configuration example of a computer.

FIG. 19 is a block diagram showing a configuration example of hardware of a computer that executes the series of processing described above by a program.

In the computer, a central processing unit (CPU) 501, a read only memory (ROM) 502, and a random access memory (RAM) 503 are interconnected by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an imaging element and the like. The output unit 507 includes a display, a speaker and the like. The recording unit 508 includes a hard disk, a nonvolatile memory and the like. The communication unit 509 includes a network interface and the like. The drive 510 drives a removable recording medium 511 such as a magnetic disk, an optical disk, a magneto-optical disk, or a semiconductor memory.

When the CPU 501 loads a program recorded in the recording unit 508, for example, to the RAM 503 via the input/output interface 505 and the bus 504 and executes the program, the computer configured as described above performs the series of processing described above.

The program executed by the computer (CPU 501) can be recorded and provided in the removable recording medium 511 as a package medium, for example. Furthermore, the program can be provided via a wired or wireless transmission medium such as a local area network, the Internet, and digital satellite broadcasting.

By mounting the removable recording medium 511 to the drive 510, the computer can install the program into the recording unit 508 via the input/output interface 505. Furthermore, the program can be received by the communication unit 509 via a wired or wireless transmission medium, and installed in the recording unit 508. Other than that, the program can be installed in advance in the ROM 502 or the recording unit 508.

Note that the program executed by the computer may be a program in which processing is performed in time series along the order explained in the present description, or may be a program in which processing is performed in parallel or at a necessary timing such as when a call is made.

Furthermore, the embodiment of the present technology is not limited to the embodiments described above, and various modifications can be made in a scope without departing from the gist of the present technology.

For example, the present technology can have a configuration of cloud computing in which one function is shared by a plurality of devices via a network and is processed in cooperation.

Furthermore, each step explained in the above-described flowcharts can be executed by one device or executed by a plurality of devices in a shared manner.

Moreover, in a case where one step includes a plurality of processing, the plurality of processing included in the one step can be executed by one device or executed by a plurality of devices in a shared manner.

Moreover, the present technology can have the following configuration.

(1)

An information processing device including a gain correction value decision unit that decides a correction value of a gain value for performing gain correction on an audio signal of an audio object in accordance with a direction of the audio object viewed from a listener.

(2)

The information processing device according to (1), in which the gain correction value decision unit decides the correction value on the basis of a three-dimensional auditory property of the listener with respect to an arrival direction of a sound.

(3)

The information processing device according to (1) or (2), in which the gain correction value decision unit decides the correction value on the basis of an orientation of the listener.

(4)

The information processing device according to any one of (1) to (3), in which the gain correction value decision unit decides the correction value so that the correction value becomes larger in a case where the audio object is present behind the listener than in a case where the audio object is present in front of the listener.

(5)

The information processing device according to any one of (1) to (4), in which the gain correction value decision unit decides the correction value so that the correction value becomes smaller in a case where the audio object is present on a lateral of the listener than in a case where the audio object is present in front of the listener.

(6)

The information processing device according to any one of (1) to (5), in which the gain correction value decision unit decides the correction value in accordance with the direction that is predetermined by obtaining the correction value in accordance with the predetermined direction by interpolation processing based on the correction value in accordance with another direction.

(7)

The information processing device according to (6), in which the gain correction value decision unit performs VBAP as the interpolation processing.

(8)

The information processing device according to (7), in which the gain correction value decision unit obtains the correction value in a linear value or a decibel value.

(9)

An information processing method, in which an information processing device decides a correction value of a gain value for performing gain correction on an audio signal of an audio object in accordance with a direction of the audio object viewed from a listener.

(10)

A program that causes a computer to execute processing including a step of deciding a correction value of a gain value for performing gain correction on an audio signal of an audio object in accordance with a direction of the audio object viewed from a listener.

(11)

A reproduction device including a gain correction unit that decides, on the basis of position information indicating a position of an audio object, a correction value of a gain value for performing gain correction on an audio signal of the audio object, the correction value in accordance with a direction of the audio object viewed from a listener, and performs the gain correction on the audio signal on the basis of the gain value corrected by the correction value, and a renderer processing unit that performs rendering processing on the basis of the audio signal obtained by the gain correction and generates reproduction signals of a plurality of channels for reproducing sound of the audio object.

(12)

The reproduction device according to (11), in which the gain correction unit corrects, by the correction value, the gain value included in metadata of the audio signal.

(13)

The reproduction device according to (11) or (12), in which the gain correction unit corrects the gain value by the correction value in a case where a flag indicative of performing correction of the gain value is supplied.

(14)

The reproduction device according to (13), in which the gain correction unit decides the correction value by using a table indicated by a supplied index among a plurality of the tables in which a direction of the audio object viewed from the listener and the correction value are associated.

(15)

The reproduction device according to any one of (11) to (14) further including:

a position information correction unit that corrects the position information included in metadata of the audio signal on the basis of information indicating a position of the listener, in which the gain correction unit decides the correction value on the basis of the position information having been corrected.

(16)

The reproduction device according to (15), in which the position information correction unit corrects the position information on the basis of information indicating a position of the listener and direction information indicating an orientation of the listener.

(17)

A reproduction method, in which a reproduction device decides, on the basis of position information indicating a position of an audio object, a correction value of a gain value for performing gain correction on an audio signal of the audio object, the correction value in accordance with a direction of the audio object viewed from a listener, performs the gain correction on the audio signal on the basis of the gain value corrected by the correction value, performs rendering processing on the basis of the audio signal obtained by the gain correction, and generates reproduction signals of a plurality of channels for reproducing sound of the audio object.

(18)

A program that causes a computer to execute processing including steps of deciding, on the basis of position information indicating a position of an audio object, a correction value of a gain value for performing gain correction on an audio signal of the audio object, the correction value in accordance with a direction of the audio object viewed from a listener, performing the gain correction on the audio signal on the basis of the gain value corrected by the correction value, performing rendering processing on the basis of the audio signal obtained by the gain correction, and generating reproduction signals of a plurality of channels for reproducing sound of the audio object.

REFERENCE SIGNS LIST

11 Information processing device
21 Gain correction value decision unit
22 Auditory property table retention unit
62 Auditory property table generation unit
64 Display control unit
122 Position information correction unit
123 Gain/frequency property correction unit

The invention claimed is:

1. An information processing device comprising:

a gain correction value decision unit that decides a correction value of a gain value for performing gain correction on an audio signal of an audio object in accordance with a direction of the audio object viewed from a listener; and a table having a plurality of inputs comprising an azimuth specifying an angle in a horizontal direction of the audio object viewed from the listener, an elevation specifying an angle in a vertical direction of the audio object viewed from the listener, and a radius specifying a distance from the audio object to the listener, and having an output comprising a gain correction table value wherein the gain correction value unit computes the correction value of a gain value from an input gain of the audio signal and the gain correction table value.

2. The information processing device according to claim 1, wherein the gain correction value decision unit decides the correction value on a basis of a three-dimensional auditory property of the listener with respect to an arrival direction of a sound.

3. The information processing device according to claim 1, wherein the gain correction value decision unit decides the correction value on a basis of an orientation of the listener.

4. The information processing device according to claim 1, wherein the gain correction value decision unit decides the correction value so that the correction value becomes larger in a case where the audio object is present behind the listener than in a case where the audio object is present in front of the listener.

5. The information processing device according to claim 1, wherein the gain correction value decision unit decides the correction value so that the correction value becomes smaller in a case where the audio object is present on a lateral of the listener than in a case where the audio object is present in front of the listener.

6. The information processing device according to claim 1, wherein the gain correction value decision unit decides the correction value in accordance with the direction that is predetermined by obtaining the correction value in accordance with the predetermined direction by interpolation processing based on the correction value in accordance with another direction.

7. The information processing device according to claim 6, wherein the gain correction value decision unit performs VBAP as the interpolation processing.

8. The information processing device according to claim 7, wherein the gain correction value decision unit obtains the correction value in a linear value or a decibel value.

9. An information processing method, wherein an information processing device decides a correction value of a gain value for performing gain correction on an audio signal of an audio object in accordance with a direction of the audio object viewed from a listener using a table having a plurality of inputs comprising an azimuth specifying an angle in a horizontal direction of the audio object viewed from the listener, an elevation specifying an angle in a vertical direction of the audio object viewed from the listener, and a radius specifying a distance from the audio object to the listener, and having an output comprising a gain correction table value wherein the information processing device computes the correction value of a gain value from an input gain of the audio signal and the gain correction table value.

10. A program stored on a non-transitory computer-readable medium that causes a computer to execute processing including:

deciding a correction value of a gain value for performing gain correction on an audio signal of an audio object in accordance with a direction of the audio object viewed from a listener using a table having a plurality of inputs comprising an azimuth specifying an angle in a horizontal direction of the audio object viewed from the listener, an elevation specifying an angle in a vertical direction of the audio object viewed from the listener, and a radius specifying a distance from the audio object to the listener, and having an output comprising a gain correction table value wherein the correction value of the gain value is determined from an input gain of the audio signal and the gain correction table value.

11. A reproduction device comprising:

a gain correction unit that decides, on a basis of position information indicating a position of an audio object, a correction value of a gain value for performing gain correction on an audio signal of the audio object, the correction value in accordance with a direction of the audio object viewed from a listener, and performs the gain correction on the audio signal on a basis of the gain value corrected by the correction value, a table having a plurality of inputs comprising an azimuth specifying an angle in a horizontal direction of the audio object viewed from the listener, an elevation specifying an angle in a vertical direction of the audio object viewed from the listener, and a radius specifying a distance from the audio object to the listener, and having an output comprising a gain correction table value wherein the gain correction value unit computes the correction value of a gain value from an input gain of the audio signal and the gain correction table value, and a renderer processing unit that performs rendering processing on a basis of the audio signal obtained by the gain correction and generates reproduction signals of a plurality of channels for reproducing sound of the audio object.

12. The reproduction device according to claim 11, wherein the gain correction unit corrects, by the correction value, the gain value included in metadata of the audio signal.

13. The reproduction device according to claim 11, wherein the gain correction unit corrects the gain value by the correction value in a case where a flag indicative of performing correction of the gain value is supplied.

14. The reproduction device according to claim 13, wherein the gain correction unit decides the correction value by using a table indicated by a supplied index among a plurality of the tables in which a direction of the audio object viewed from the listener and the correction value are associated.

15. The reproduction device according to claim 11 further comprising:

a position information correction unit that corrects the position information included in metadata of the audio signal on a basis of information indicating a position of the listener, wherein the gain correction unit decides the correction value on a basis of the position information having been corrected.

16. The reproduction device according to claim 15, wherein the position information correction unit corrects the position information on a basis of information indicating a position of the listener and direction information indicating an orientation of the listener.

17. A reproduction method, wherein a reproduction device decides, on a basis of position information indicating a position of an audio object, a correction value of a gain value for performing gain correction on an audio signal of the audio object, the correction value in accordance with a direction of the audio object viewed from a listener using a table having a plurality of inputs comprising an azimuth specifying an angle in a horizontal direction of the audio object viewed from the listener, an elevation specifying an angle in a vertical direction of the audio object viewed from the listener, and a radius specifying a distance from the audio object to the listener, and having an output comprising a gain correction table value wherein the correction value of the gain value is computed from an input gain of the audio signal and the gain correction table value, performs the gain correction on the audio signal on a basis of the gain value corrected by the correction value, performs rendering processing on a basis of the audio signal obtained by the gain correction, and generates reproduction signals of a plurality of channels for reproducing sound of the audio object.

18. A program stored on a non-transitory computer readable medium that causes a computer to execute processing including steps of deciding, on a basis of position information indicating a position of an audio object, a correction value of a gain value for performing gain correction on an audio signal of the audio object, the correction value in accordance with a direction of the audio object viewed from a listener using a table having a plurality of inputs comprising an azimuth specifying an angle in a horizontal direction of the audio object viewed from the listener, an elevation specifying an angle in a vertical direction of the audio object viewed from the listener, and a radius specifying a distance from the audio object to the listener, and having an output comprising a gain correction table value wherein the correction value of the gain value is computed from an input gain of the audio signal and the gain correction table value, performing the gain correction on the audio signal on a basis of the gain value corrected by the correction value, performing rendering processing on a basis of the audio signal obtained by the gain correction, and generating reproduction signals of a plurality of channels for reproducing sound of the audio object.

* * * * *